United States Patent
Hirose et al.

(10) Patent No.: US 9,508,991 B2
(45) Date of Patent: Nov. 29, 2016

(54) ACTIVE MATERIAL FOR RECHARGEABLE BATTERY, RECHARGEABLE BATTERY, AND ELECTRONIC APPARATUS

(71) Applicant: Sony Corporation, Tokyo (JP)

(72) Inventors: Takakazu Hirose, Fukushima (JP);
Kenichi Kawase, Fukushima (JP);
Shinji Tanaka, Kanagawa (JP);
Takashi Fujinaga, Fukushima (JP);
Akira Takamuku, Fukushima (JP)

(73) Assignee: SONY CORPORATION, Tokyo (JP)

(*) Notice: Subject to any disclaimer, the term of this patent is extended or adjusted under 35 U.S.C. 154(b) by 901 days.

(21) Appl. No.: 13/711,310

(22) Filed: Dec. 11, 2012

(65) Prior Publication Data
US 2013/0157127 A1 Jun. 20, 2013

(30) Foreign Application Priority Data
Dec. 20, 2011 (JP) .................. 2011-278526

(51) Int. Cl.
| | |
|---|---|
| *H01M 4/48* | (2010.01) |
| *H01M 4/131* | (2010.01) |
| *H01M 4/36* | (2006.01) |
| *H01M 4/485* | (2010.01) |
| *B60L 3/00* | (2006.01) |
| *B60L 7/14* | (2006.01) |
| *B60L 11/14* | (2006.01) |
| *B60L 11/18* | (2006.01) |
| *H01M 10/0525* | (2010.01) |

(52) U.S. Cl.
CPC .............. *H01M 4/48* (2013.01); *B60L 3/0046* (2013.01); *B60L 7/14* (2013.01); *B60L 11/14* (2013.01); *B60L 11/1816* (2013.01); *B60L 11/1842* (2013.01); *B60L 11/1846* (2013.01); *B60L 11/1859* (2013.01); *B60L 11/1875* (2013.01); *B60L 11/1877* (2013.01); *H01M 4/131* (2013.01); *H01M 4/366* (2013.01); *H01M 4/485* (2013.01); *B60L 2210/40* (2013.01); *B60L 2230/30* (2013.01); *B60L 2230/34* (2013.01); *B60L 2240/545* (2013.01); *B60L 2240/547* (2013.01); *B60L 2240/549* (2013.01); *H01M 10/0525* (2013.01); *Y02E 60/122* (2013.01); *Y02E 60/721* (2013.01); *Y02T 10/70* (2013.01); *Y02T 10/7005* (2013.01); *Y02T 10/705* (2013.01); *Y02T 10/7011* (2013.01); *Y02T 10/7077* (2013.01); *Y02T 10/7088* (2013.01); *Y02T 10/7241* (2013.01); *Y02T 90/121* (2013.01); *Y02T 90/127* (2013.01); *Y02T 90/128* (2013.01); *Y02T 90/14* (2013.01); *Y02T 90/163* (2013.01); *Y02T 90/169* (2013.01); *Y04S 10/126* (2013.01); *Y04S 30/14* (2013.01)

(58) Field of Classification Search
None
See application file for complete search history.

(56) References Cited

FOREIGN PATENT DOCUMENTS

| | | |
|---|---|---|
| JP | 2009-212074 | 9/2009 |
| JP | 2011-233497 | 11/2011 |

*Primary Examiner* — Sarah A Slifka
(74) *Attorney, Agent, or Firm* — Chip Law Group

(57) ABSTRACT

A rechargeable battery including: a positive electrode; a negative electrode including active material; and an electrolytic solution, in which the active material is capable of occluding and releasing lithium ions and includes Si and O as constituent elements, and an atomic ratio (Si/(Si+O)) of Si with respect to Si and O is 30 atomic % to 75 atomic % in a surface of the active material.

15 Claims, 13 Drawing Sheets

ACTIVE MATERIAL FOR RECHARGEABLE BATTERY, RECHARGEABLE BATTERY, AND ELECTRONIC APPARATUS

CROSS REFERENCES TO RELATED APPLICATIONS

The present application claims priority to Japanese Priority Patent Application JP 2011-278526 filed in the Japan Patent Office on Dec. 20, 2011, the entire content of which is hereby incorporated by reference.

BACKGROUND

The present application relates to an active material for a rechargeable battery capable of occluding and releasing lithium ions, a rechargeable battery using this active material, and an electronic apparatus using this rechargeable battery.

In recent years, electronic apparatuses typified by mobile phones, mobile information terminal devices (PDAs), or the like have become widespread, in relation to which there is a strong demand for further miniaturization, weight reduction and increased life spans. Accordingly, as a power source, the development of batteries, in particular, compact and lightweight rechargeable batteries capable of obtaining a high energy density is being pursued. Recently, without being limited to the above-described electronic apparatuses, studies are also being carried out into the application of rechargeable batteries for various purposes represented by battery packs, which are removable power sources, electric vehicles such as electric cars, electricity storage systems such as household electricity servers, and power tools such as electric drills or the like.

As rechargeable batteries, ones using various discharge and charge principles have been widely proposed; however, among these, ones using the releasing and occluding of lithium ions or the like are promising. This is because it is possible to obtain a higher energy density than lead batteries, nickel cadmium batteries, and the like.

A rechargeable battery is provided with a positive electrode and a negative electrode, as well as an electrolytic solution, and the negative electrode includes a negative electrode active material capable of occluding and releasing lithium ions or the like. As the negative electrode active material, carbon material such as graphite is widely used; however, recently, as a result of demand for further improvement in battery capacity, the use of Si is being studied. This is because, since the theoretical capacity of Si (4199 mAh/g) is far greater than the theoretical capacity of graphite (372 mAh/g), it is possible to expect a large improvement in the battery capacity.

However, since Si vigorously expands and contracts during charge and discharge, the negative electrode active material is easily cracked primarily in the vicinity of the surface layer. If the negative electrode active material is cracked, since a highly reactive new surface (active surface) is generated, the surface area (reaction area) of the negative electrode active material is increased. In this manner, since the electrolytic solution for forming the coating film derived from the electrolytic solution is consumed in the new surface along with the generation of the decomposition reaction of the electrolytic solution in the new surface, the battery characteristics such as the cycle characteristics are easily decreased.

Here, in order to improve the battery characteristics such as the cycle characteristics, various studies are being carried out in relation to the configuration of rechargeable batteries. Specifically, in order to improve the cycle characteristics and the initial charging and discharging characteristics, a non-crystalline or low crystalline coating portion ($SiO_y$: $0.5 \le y \le 1.8$) is provided on the surface of a core portion ($SiO_x$: $0 \le x \le 0.5$) (for example, refer to Japanese Unexamined Patent Application Publication No. 2011-233497). In addition, in order to fulfil the same purpose, lithium is doped into a silicon-silicon oxide based composite (for example, refer to Japanese Unexamined Patent Application Publication No. 2009-212074).

SUMMARY

Since electronic apparatuses and the like are becoming increasingly high performance and multi-functional and the usage frequencies thereof are increasing, there is a tendency for rechargeable batteries to be frequently charged and discharged. Therefore, it is desirable to further improve the characteristics of the rechargeable batteries.

It is desirable to provide an active material for a rechargeable battery capable of obtaining excellent battery characteristics, a rechargeable battery, and an electronic apparatus.

According to an embodiment of the present application, there is provided an active material for a rechargeable battery, which is capable of occluding and releasing lithium ions and which includes Si and O as constituent elements, in which the atomic ratio (Si/(Si+O)) of Si with respect to Si and O is 30 atomic % to 75 atomic % in the surface of the active material. In addition, a rechargeable battery according to another embodiment of the present application is provided with a positive electrode, a negative electrode including an active material, and an electrolytic solution, in which the active material has the same configuration as the active material for a rechargeable battery according to the embodiment of the present application described above. In addition, an electronic apparatus according to still another embodiment of the present application is provided with a rechargeable battery, in which the rechargeable battery has the same configuration as the rechargeable battery according to another embodiment of the present application described above.

According to embodiments of the present application, there is provided the active material for a rechargeable battery or the rechargeable battery in which, in the active material including Si and O as constituent elements, since the atomic ratio of Si with respect to Si and O is 30 atomic % to 75 atomic % in the surface of the active material, it is possible to obtain excellent battery characteristics. In addition, it is possible to obtain a similar effect even in the electronic apparatus using the rechargeable battery according to the embodiment of the present application.

Additional features and advantages are described herein, and will be apparent from the following Detailed Description and the figures.

DETAILED DESCRIPTION

Hereinafter, embodiments of the present application will be described in detail with reference to the drawings. Here, the order of the description will be as follows.

Figure 1:
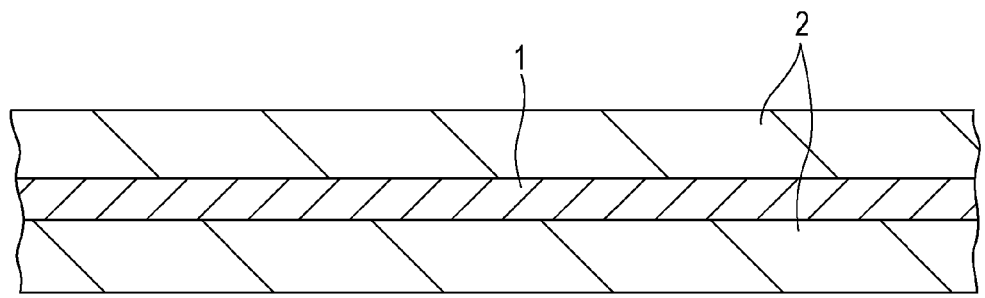
FIG. 1 is a cross-sectional view representing the configuration of a negative electrode using the active material for a rechargeable battery according to an embodiment of the present application.

1. Electrode using the active material for a rechargeable battery
2. Rechargeable battery
2-1. Square type
2-2. Cylindrical type
2-3. Laminated film type
3. Uses of rechargeable battery
3-1. Battery pack
3-2. Electric vehicle
3-3. Power storage system
3-4. Power tool 1. Electrode Using an Active Material for a Rechargeable Battery FIG. 1 represents a cross-sectional configuration of a negative electrode which is an electrode using the active material for a rechargeable battery according to an embodiment of the present application and FIGS. 2A and 2B and FIGS. 3A and 3B represent cross-sectional configurations of negative electrode active materials which are the active material for a rechargeable battery according to an embodiment of the present application. FIGS. 4 to 7 are HAADF STEM photographs (below, simply referred to as "TEM photographs") of a cross-sectional structure of the negative electrode active material.

Overall Configuration of Negative Electrode

The negative electrode, for example, is used in a rechargeable battery or the like, and, as shown in FIG. 1, includes a negative electrode active material layer 2 on a negative electrode current collector 1. The above negative electrode active material layer 2 may be provided on both surfaces of the negative electrode current collector 1 or may be provided only on one surface. However, the negative electrode current collector 1 may be omitted.

Negative Electrode Current Collector

For example, the negative electrode current collector 1 is formed of a conductive material having excellent electrochemical stability, electrical conductivity, and mechanical strength, and this conductive material is, for example, a metal material such as Cu, Ni, or stainless steel. Among these, a material which does not form an intermetallic compound with Li and which is alloyed with the negative electrode active material layer 2 is preferable.

The negative electrode current collector 1 preferably includes carbon (C) and sulfur (S) as constituent elements. This is because since the physical strength of the negative electrode current collector 1 is improved, the negative electrode current collector 1 is not easily deformed even when the negative electrode active material layer 2 expands and contracts during charging and discharging. Specifically, for example, the negative electrode current collector 1 is a metal foil or the like doped with C and S. The content of C and S is not particularly limited; however, among these, 100 ppm or less is preferable. This is because it is possible to obtain a greater effect.

The surface of the negative electrode current collector 1 (surface contacting the negative electrode active material layer 2) may be roughened, or may not be roughened. The negative electrode current collector 1 which has not been roughened, for example, is a rolled metal foil or the like and, along with this, the negative electrode current collector 1 which has been roughened, for example, is a metal foil or the like subjected to electrolytic treatment, a sandblasting treatment or the like. The electrolytic treatment is a method of providing irregularities by forming fine particles on the surface of the metal foil or the like using an electrolytic method in an electrolytic bath. In general, the metal foil manufactured by the electrolytic method is called electrolytic foil (for example, electrolytic Cu foil or the like).

Among these, the surface of the negative electrode current collector 1 is preferably roughened. This is because the adhesion of the negative electrode active material layer 2 with respect to the negative electrode current collector 1 is improved by the anchor effect. The surface roughness (for example, ten-point average roughness Rz or the like) of the negative electrode current collector 1 is not particularly limited; however, in order to improve the adhesion of the negative electrode active material layer 2 using the anchor effect, it is preferably as large as possible. However, if the surface roughness is excessively large, there is a possibility that the adhesion of the negative electrode active material layer 2 may be decreased instead.

Negative Electrode Active Material Layer

The negative electrode active material layer 2 includes one or two or more negative electrode active materials in particle form which are capable of occluding and releasing an electrode reactant (lithium ions), and, according to necessity, may further include other material such as a negative electrode binding agent or a negative electrode conductive agent.

The above negative electrode active material includes Si and O as constituent materials, and, according to necessity, may also include one type or two or more types of other elements. However, the atomic ratio (Si/(Si+O)) of Si with respect to Si and O is 30 atomic % to 75 atomic % in the surface of the negative electrode active material.

Strictly speaking, the "surface" is the outermost surface (interface between the negative electrode active material and the electrolytic solution) of the negative electrode active material in contact with the electrolytic solution in a case where the negative electrode active material is used in a rechargeable battery. Here, in a case where a conductive layer to be described later is formed on the surface of the negative electrode active material, the "surface" is the outermost surface (interface between the negative electrode active material and the conductive layer) of the negative electrode active material in contact with the conductive layer.

This atomic ratio is computed by atomic ratio (atomic %)=[atomic weight of Si/(atomic weight of Si+atomic weight of O)]×100. Here, for example, it is possible to specify the respective atomic weights of each of Si and O by measuring a cross-section of the negative electrode active material from the surface side using an energy dispersive X-ray spectroscopic method (TEM/EDX). The TEM apparatus is set to be JEM-2100F manufactured by JEOL, Ltd., and the EDX apparatus is set to be JED-2300T manufactured by JEOL, Ltd. The measurement conditions are acceleration voltage=200 kVm, beam current=240 pA, beam diameter=0.15 mm, and analysis (total) time=30 seconds.

The reason for including Si as a constituent element of the negative electrode active material is because it is possible to obtain a higher energy density, whereby it is possible to obtain a large battery capacity. In addition, the reason for including Si and O as constituent elements of the negative electrode active material is because it is possible to obtain excellent cycle characteristics or the like.

The reason for the atomic ratio being 30 atomic % to 75 atomic % in the surface of the negative electrode active material is because it is possible to obtain excellent initial charging and discharging characteristics and cycle characteristics. In detail, when the atomic ratio is less than 30 atomic %, since the quantity of O becomes too large in comparison with the quantity of Si, the electrical resistance is increased. In this manner, it is difficult to obtain sufficient charging and discharging efficiency from the time of the initial charging and discharging. On the other hand, when the atomic ratio exceeds 75 atomic %, since the quantity of Si becomes too large in comparison with the quantity of O, the acceptance of the lithium ions is improved but the Si will be easily degraded (surface degradation) if the charging and discharging is repeated. In this manner, it is difficult to obtain sufficient cycle characteristics. Therefore, in order to obtain excellent initial charging and discharging characteristics and cycle characteristics while ensuring the acceptance of lithium ions, the atomic ratio should be within the above-described range.

In the above, the atomic ratio in the surface of the negative electrode active material is more preferably 30 atomic % to 70 atomic %. This is because it is possible to obtain a greater effect.

In at least the surface vicinity portion (surface and portion of the vicinity thereof) in the above negative electrode active material, the atomic ratio may transition in any manner toward the center of the negative electrode active material. In other words, the atomic ratio may be gradually reduced, may be gradually increased, or may be constant.

In the above, it is preferable that the atomic ratio be gradually reduced from the surface to the center of the negative electrode active material. This is because, since the quantity of Si becomes large in comparison with the quantity of O at the center side of the negative electrode active material, the releasing and occluding amounts of lithium ions are secured. In this manner, it is possible to obtain a large battery capacity. In addition, this is because, since the quantity of Si becomes small in comparison with the quantity of O at the surface side of the negative electrode active material, if the atomic ratio in the surface of the negative electrode active material is within the above-described range, lithium ions easily move in and out, and it is possible to obtain high cycle characteristics.

The crystallinity of at least the surface vicinity portion in the negative electrode active material is not particularly limited; however, here, non-crystallinity or low crystallinity is preferable. This is so that, even if the negative electrode active material expands and contracts in the charging and discharging, the negative electrode active material is not easily damaged (cracks or the like). Here, the term "low crystallinity" signifies a crystalline state in which the crystal regions (crystal grains) are scattered in the non-crystalline regions and the details thereof will be described below.

In a case where the surface vicinity portion of the above-described negative electrode active material has low crystallinity, the degree of crystallinity in the low crystallinity portion is not particularly limited. Among the above, it is preferable that the average area occupancy rate of the crystal grains derived from the (111) surface and the (220) surface of the Si be 35% or less and the average particle diameter of the crystal grains be 50 nm or less. This is because it is possible to obtain a greater effect. Here, description will be given below of the measurement methods of the average area occupancy rate and the average particle diameter.

If the above negative electrode active material has the above-described properties, it may adopt any configuration as a whole.

Figure 2A:
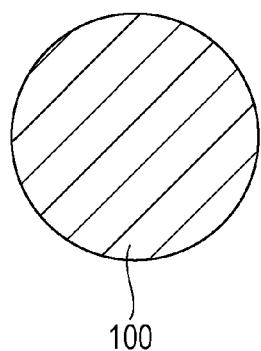
FIGS. 2A and 2B are cross-sectional views schematically representing the configuration of a negative electrode active material which is the active material for a rechargeable battery according to an embodiment of the present application.

For example, as shown in FIG. 2A, the material may physically be one granular body (negative electrode active material 100) as a whole. The atom ratio z (O/Si) of O with respect to Si of the above negative electrode active material 100 satisfies $0.5 \leq z \leq 1.8$, for example. That is, the negative electrode active material 100 includes oxides of Si ($SiO_z$: $0.5 \leq z \leq 1.8$). This is because it is possible to obtain an excellent battery capacity, initial charging and discharging characteristics, cycle characteristics, and the like.

As described above, it is preferable that the atomic ratio be gradually reduced from the surface to the center of the negative electrode active material 100. This is because it is possible to obtain the above-described advantages since the quantity of Si becomes large in comparison with the quantity of O at the center side of the negative electrode active material 100 and the quantity of Si becomes small in comparison with the quantity of O at the surface side. In such a case, the atomic ratio of the inner portion of the negative electrode active material 100 is not particularly limited; however, here, at a position of 300 nm from the surface toward the center of the negative electrode active material 100, the atomic ratio is preferably 35 atomic % to 60 atomic %. This is because it is possible to obtain a greater effect.

Here, the negative electrode active material 100 may include Si and O and may also include one type or two or more types of other elements. Specifically, it is preferable that the negative electrode active material 100 include Fe as a constituent element. This is in order to decrease the electrical resistance of the negative electrode active material 100. Inside the above negative electrode active material 100, the Fe may be present separately (in a free state) from the Si and O, or may form an alloy or a compound with at least one of Si and O. It is possible to confirm the state (Fe bonding state or the like) of the negative electrode active material 100 including the above Fe using EDX or the like, for example.

The crystallinity of the above negative electrode active material 100 is not particularly limited, and it may have high crystallinity, or low crystallinity. Since the details relating to the low crystallinity of the above negative electrode active material 100 are the same as for the low crystallinity of a coating portion 202 to be described later, description thereof will be omitted.

Figure 2B:
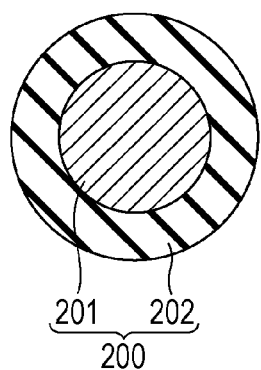
Figure 4:
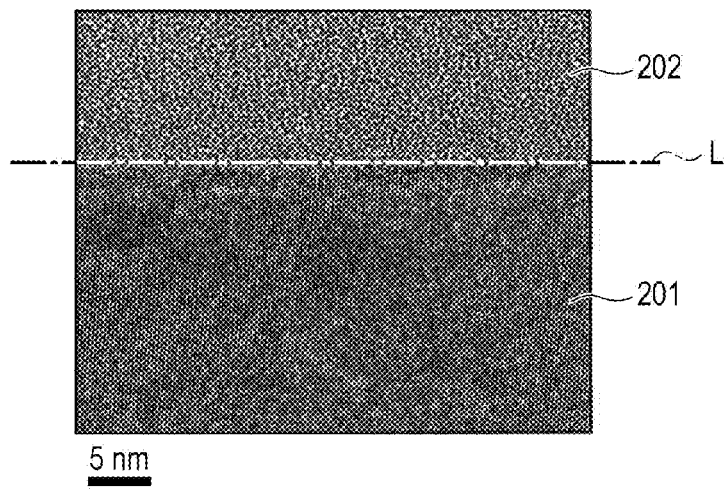
FIG. 4 is a high-angle annular dark-field scanning transmission electron microscope (HAADF STEM) photograph representing an enlarged cross-sectional structure of the negative electrode active material (coating portion=non-crystalline).
Figure 5:
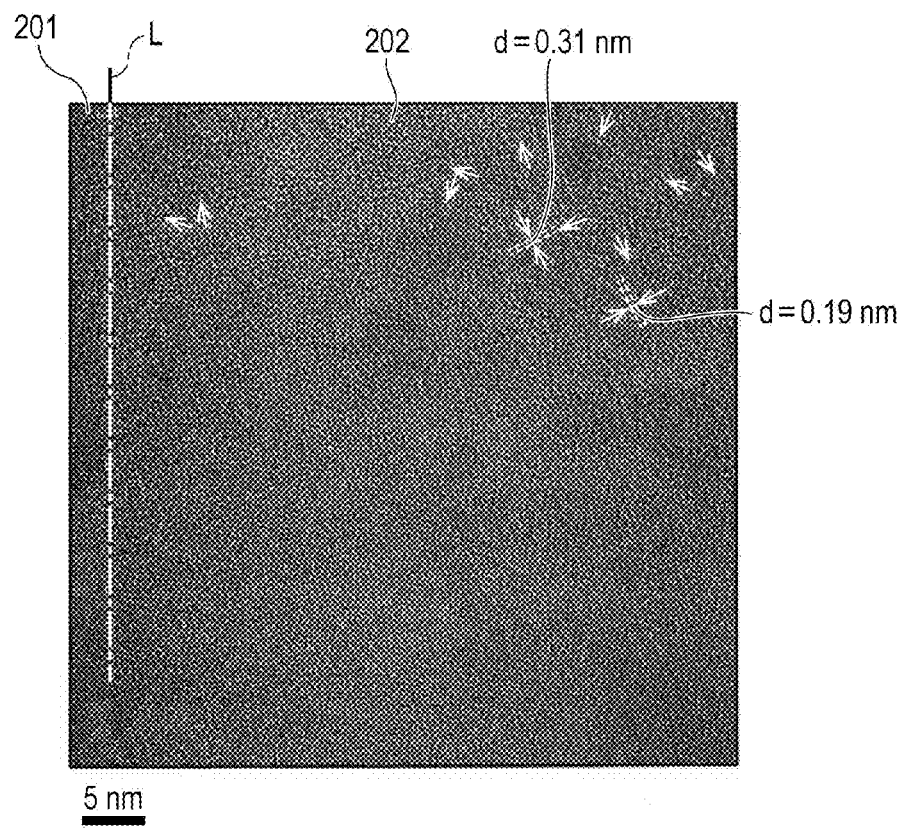
FIG. 5 is an HAADF STEM photograph representing an enlarged cross-sectional structure of the negative electrode active material (coating portion=low crystalline).
Figure 6:
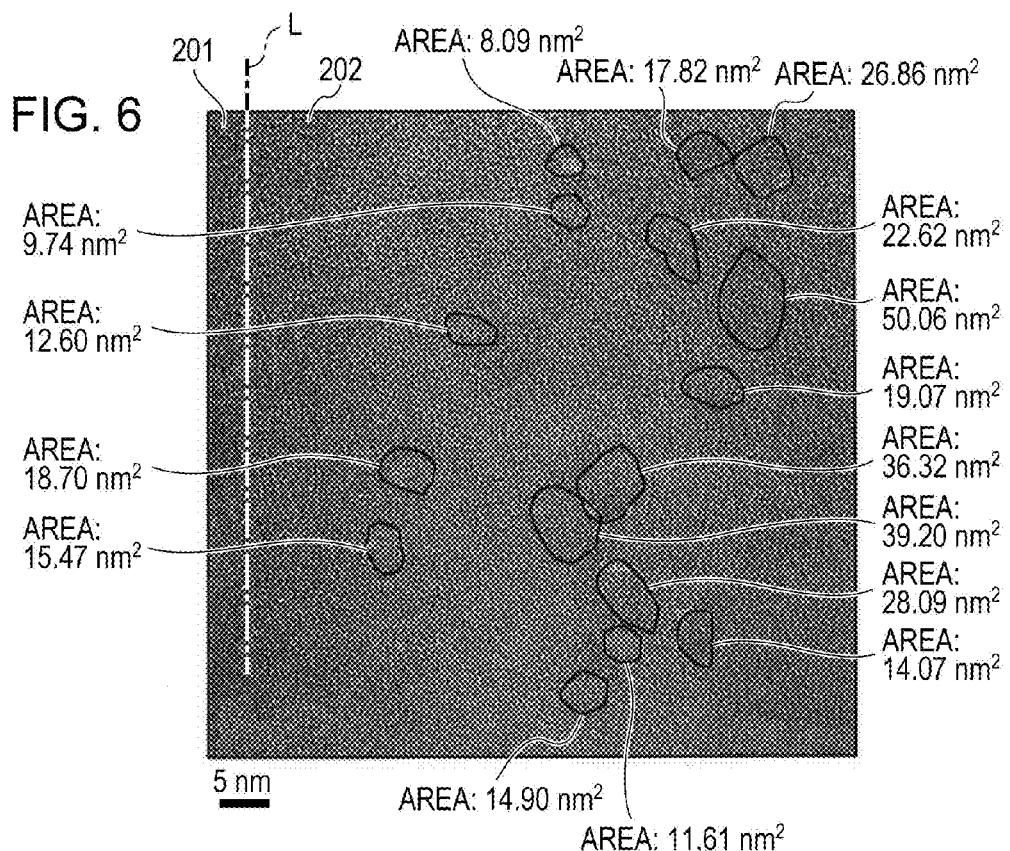
FIG. 6 is another HAADF STEM photograph representing an enlarged cross-sectional structure of the negative electrode active material (coating portion=low crystalline).

Alternatively, for example, as shown in FIG. 2B, the material may be a composite granular body (negative electrode active material 200) including a core portion 201 and the coating portion 202. In the above negative electrode active material 200, the coating portion 202 is provided on the surface of the core portion 201, and it is possible to confirm the state in which the core portion 201 is coated by the coating portion 202 in this manner using a scanning electron microscope (SEM) or the like, for example. In addition, as shown in FIGS. 4 to 6, it is possible to confirm the crystallinity (crystalline state) of the core portion 201 and the coating portion 202 using TEM or the like.

As described above, it is preferable that the atomic ratio be gradually reduced from the surface of the negative electrode active material 200 to the interface of the core portion 201 and the coating portion 202. This is because it is possible to obtain the above-described advantages since the quantity of Si becomes large in comparison with the quantity of O at the center side (core portion 201) of the negative electrode active material 200 and the quantity of Si becomes small in comparison with the quantity of O at the surface side (coating portion 202). In such a case, the atomic ratio of the inner portion of the negative electrode active material 200 is not particularly limited; however, here, at the interface of the core portion 201 and the coating portion 202, the atomic ratio is preferably 35 atomic % to 60 atomic %. This is because it is possible to obtain a greater effect.

For example, the core portion 201 includes Si and O as constituent materials, and the atom ratio x (O/Si) of O with respect to Si satisfies 0≤x≤0.5. That is, for example, the core portion 201 includes a silicon based material (SiO$_x$: 0≤x≤0.5). This is because, in comparison with a case (x≥0.5) where the atom ratio x is outside this range, since the core portion 201 more easily occludes and releases lithium ions during charging and discharging and the irreversible capacity is reduced, it is possible to obtain a large battery capacity.

As is clear from the above-described composition (atom ratio x), the forming material of the core portion 201 may be Si alone (x=0), or may be an oxide of Si (SiO$_x$: 0<x<0.5). However, x is preferably as small as possible, and x=0 (Si alone) is more preferable. This is because, since it is possible to obtain a higher energy density, the battery capacity becomes larger. In addition, this is because, since the degradation of the core portion 201 is suppressed, the discharge capacity from the initial period of the charging and discharging cycle is not easily decreased. However, "alone" is simply alone in the general sense and does not necessarily mean a 100% purity. That is, the Si alone may include trace impurities (elements other than O).

The crystallinity of the core portion 201 may be any of high crystallinity, low crystallinity, or non-crystallinity; however, here, high crystallinity or low crystallinity is preferable, and high crystallinity is more preferable. This is because it is possible to obtain a high battery capacity and the like since the core portion 201 more easily occludes and releases lithium ions during charging and discharging. In addition, this is because the core portion 201 does not easily expand and contract during charging and discharging. In the above, the half-value width (2θ) of the diffraction peak derived from the (111) crystal surface of Si obtained by X-ray diffraction is preferably 20° or less. In addition, the crystallite size derived from the (111) crystal surface of Si is preferably 10 nm or more. This is because it is possible to obtain a greater effect.

Here, the core portion 201 may include Si and O and may also include one type or two or more types of other elements. Specifically, it is preferable that the core portion 201 include Fe as a constituent element. This is in order to decrease the electrical resistance of the core portion 201. The ratio of Fe with respect to Si and O (Fe/(Si+O)) is not particularly limited; however, among these, 0.01 mass % to 7.5 mass % is preferable. This is in order to not only decrease the electrical resistance of the core portion 201 but to improve the diffusion of lithium ions.

Inside the core portion 201, the Fe may be present separately (in a free state) from the Si and O, or may form an alloy or a compound with at least one of Si and O. The same also applies with respect to Al or the like to be described later. It is possible to confirm the state (Fe bonding state or the like) of the core portion 201 including the above Fe using EDX or the like, for example.

In addition, the core portion 201 may include at least one element from among Al, Cr, Ni, B, Mg, Ca, Ti, V, Mn, Co, Cu, Ge, Y, Zr, Mo, Ag, In, Sn, Sb, Ta, W, Pb, La, Ce, Pr, and Nd as a constituent element. Among the above, at least one type from among Al, Ca, Mn, Cr, Mg, and Ni is preferable. This is in order to decrease the electrical resistance of the core portion 201. The ratio of Al or the like with respect to Si and O (Al or the like/(Si+O)) is not particularly limited. Here, when the core portion 201 includes Al, the crystallization is lowered, whereby the above core portion 201 does not easily expand and contract during charging and discharging and the diffusion of the lithium ions is improved.

The average particle diameter of the core portion 201 (median diameter D50) is not particularly limited; however, here, 0.1 μm to 20 μm is preferable. This is because it is possible to obtain a greater effect. In detail, since the surface area is increased if D50 is too small, there is a possibility of causing a decrease in safety, while if D50 is too large, there is a possibility of causing damage to the negative electrode active material 200 due to expansion during charging. In addition, if D50 is too small, there is a possibility that it will become difficult to coat a slurry including the negative electrode active material 200.

The coating portion 202 is provided on at least a part of the surface of the core portion 201. For this reason, the coating portion 202 may coat only a part of the surface of the core portion 201, or may coat the entirety thereof. In the former case, the coating portion 202 may be scattered in a plurality of places on the surface of the core portion 201.

For example, the coating portion 202 includes Si and O as constituent materials, and the atom ratio y (O/Si) of O with respect to Si satisfies $0.5 \le y \le 1.8$. That is, for example, the coating portion 202 includes a silicon based material ($SiO_y$: $0.5 \le y \le 1.8$). This is in order to suppress the degradation of the negative electrode active material 200 even when charging and discharging is repeated. In this manner, the core portion 201 is chemically and physically protected by the coating portion 202 while ensuring the acceptance of lithium ions in the core portion 201.

In detail, when the coating portion 202 is interposed between the core portion 201 and the electrolytic solution, since it is not easy for the highly reactive core portion 201 to come into contact with the electrolytic solution, the decomposition reaction of the electrolytic solution is suppressed. In such a case, if the coating portion 202 is formed by a material (material containing a common element (Si) as a constituent element) having the same base as the core portion 201, the adhesion of the coating portion 202 with respect to the above core portion 201 also becomes great.

In addition, since the coating portion 202 has flexibility (property of being easily deformable), even when the core portion 201 expands and contracts during charging and discharging, the coating portion 202 also expands and contracts (stretches) more easily in accordance therewith. In this manner, since the coating portion 202 is less easily damaged (snapping or the like) during the expansion and contraction of the core portion 201, the coated state of the core portion 201 by the coating portion 202 is maintained even when charging and discharging is repeated. Therefore, since the new surface is less easily exposed and the new surface does not easily come into contact with the electrolytic solution even if the core portion 201 is cracked during charging and discharging, the decomposition reaction of the electrolytic solution is remarkably suppressed.

As is clear from the above-described composition (atom ratio y), the forming material of the coating portion 202 is an oxide of Si ($SiO_y$). In particular, the atom ratio y preferably satisfies $0.7 \le y \le 1.3$, and is more preferably $y=1.2$. This is because it is possible to obtain a greater effect. Here, the coating portion 202 may include Si and O and may also include one type or two or more types of other elements. Specifically, it is preferable that the coating portion 202 include at least one type from among Fe, Al, and Ca as a constituent element. This is in order to decrease the electrical resistance of the coating portion 202. The ratio of Fe or the like with respect to Si and O (Fe or the like/(Si+O)) is arbitrary.

The crystallinity of the coating portion 202 is not particularly limited; however, it is preferably lower (close to non-crystallinity) than the crystallinity of the core portion 201, and, more specifically, low crystallinity or non-crystallinity (amorphousness) are preferable. This is because, since the lithium ions are easily diffused in comparison with a case of high crystallinity, even if the surface of the core portion 201 is coated by the coating portion 202, the core portion 201 easily and smoothly occludes and releases the lithium ions. Here, "the crystallinity of the coating portion 202 is lower than the crystallinity of the core portion 201" signifies that, in a case where the core portion 201 has high crystallinity, the coating portion 202 has low crystallinity or non-crystallinity, for example. Alternatively, it signifies that, for example, in a case where the core portion 201 has low crystallinity, the coating portion 202 has non-crystallinity.

In particular, the coating portion 202 more preferably has non-crystallinity. This is because, since the flexibility of the coating portion 202 is increased, the above coating portion 202 more easily follows the expansion and contraction of the core portion 201 during charging and discharging. In addition, this is because, since the coating portion 202 is less likely to trap the lithium ions, it is more difficult to inhibit the movement of the lithium ions in and out of the core portion 201.

Figure 7:
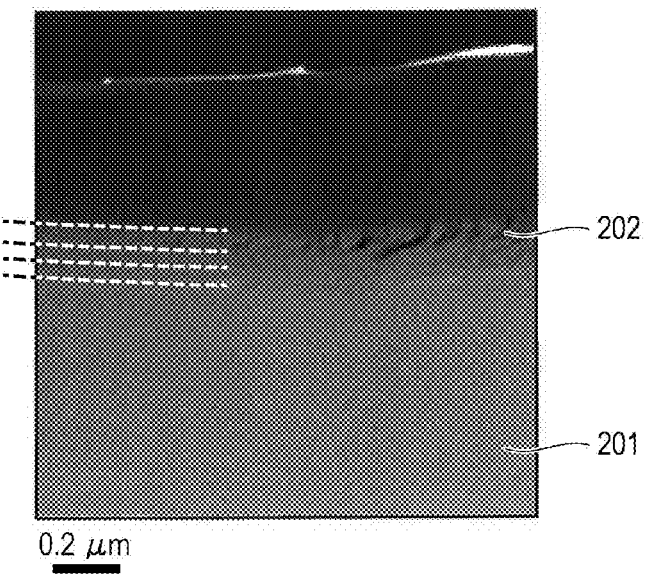
FIG. 7 is an HAADF STEM photograph representing an enlarged cross-sectional structure of the negative electrode active material (coating portion=non-crystalline).

Here, FIG. 4 and FIG. 7 show cases where the core portion 201 is high crystallinity Si and the coating portion 202 is non-crystallinity $SiO_y$. On the other hand, in FIG. 5 and FIG. 6 show cases where the core portion 201 is high crystallinity Si and the coating portion 202 is low crystallinity $SiO_y$.

Here, "low crystallinity" signifies a crystal state where both non-crystal regions and crystal regions (crystal grains) are present in a case where a cross-section or the surface of the coating portion 202 is observed using a HAADF STEM or the like. If it is possible to confirm the state where non-crystal regions and crystal regions are mixed from the TEM photograph, the above coating portion 202 has low crystallinity. Here, in a case where non-crystal regions and crystal regions are mixed, the crystal regions are observed as regions (crystal grains) having a granular outline. Since striped patterns (crystal cross stripes) due to the crystallinity are observed in the inner portion of the above crystal grains, it is possible to distinguish the crystal grains from the non-crystal regions. In contrast, "non-crystallinity" is the same as amorphousness and signifies a crystal state where crystal regions are not present and only non-crystal regions are present in a case where the coating portion is observed using a HAADF STEM or the like. Here, for example, the magnification during observation is set to $1.2 \times 10^6$ times.

The difference between the non-crystallinity and low crystallinity is clear from the TEM photographs shown in FIG. 4 and FIG. 5. In a case where the coating portion 202 has non-crystallinity, as shown in FIG. 4, only the non-crystal region is observed, and the crystal regions (crystal grains having crystal cross stripes) are not observed. In contrast, in a case where the coating portion 202 has low crystallinity, as shown in FIG. 5, the state where the crystal grains (portion shown by the arrow) are scattered in the non-crystal regions is observed. Since the above crystal grains have crystal cross stripes of predetermined intervals corresponding to the lattice spacing d of Si, a clear distinction is made with the surrounding non-crystal region. Here, since spots lined up in a ring shape when the TEM photograph shown in FIG. 5 underwent Fourier transformation (when a diagram corresponding to an electron diffraction diagram was obtained), it was confirmed that a large number of crystal regions were present in the inner portion of the coating portion 202.

Here, for example, the observation procedure of the outer shell portion using a HAADF STEM is as follows. First, after coating an adhesive onto the surface of the TEM grid made of Cu, samples (negative electrode active material 200) are sprinkled onto the adhesive. Subsequently, carbon material (graphite) is deposited on the surface of the powder sample using a vacuum deposition method. Subsequently, after depositing a thin film (Pt/W) onto the surface of the carbon material using a focused ion beam (FIB) method, further thin film processing (acceleration voltage=30 kV) is carried out. Finally, a cross-section of the negative electrode active material 200 is observed using a HAADF STEM (acceleration voltage=200 kV). The above observation method is a method which is sensitive to the composition of the sample, whereby, in general, it is possible to obtain an image with bright contrast approximately proportional to the square of the atomic number.

In the TEM photographs shown in FIG. 4 and FIG. 5, regions having different crystal states with the line L as a boundary may be observed. It was confirmed that, when the region having these different crystal states was analyzed using EDX, the region positioned at the inner side relative to the line L was the core portion 201 (Si) having high crystallinity and that the region positioned at the outer side relative to the line L was the coating portion 202 (SiO$_y$) having low crystallinity or non-crystallinity.

The degree of low crystallinity of the coating portion 202 is not particularly limited; however, here, it is preferable that the average area occupancy rate of the crystal grains derived from the (111) surface and the (220) surface of the Si be 35% or less, more preferably 25% or less, and even more preferably 20% or less. This is because it is possible to obtain a greater effect. As shown in FIG. 5, the "crystal grains derived from the (111) surface" are the crystal region having crystal cross stripes in which the lattice spacing d=0.31 nm and the "crystal grains due to the (220) surface" are the crystal region having crystal cross stripes in which the lattice spacing d=0.19 nm.

The procedure for computing the above average area occupancy rate is as follows. Finally, as shown in FIG. 6, the cross-section of the coating portion 202 is observed using a HAADF STEM to obtain a TEM photograph. In such a case, setting is performed such that the observation magnification=1.2×10$^6$ times, and the observation area=65.6 nm×65.7 nm. Here, FIG. 6 is a TEM photograph in which the same region as FIG. 5 is observed. Subsequently, after the presence or absence of crystal cross stripes, the value of the lattice spacing d, and the like are investigated, and the range in which the crystal grains derived from the (111) surface of Si and the crystal grains derived from the (220) surface of Si are present is specified, the outline of the above crystal grains is drawn in the TEM photograph. Subsequently, after computing the area of each crystal grain, the area occupancy rate (%)=(sum of the areas of the crystal grains/area of the observation area)×100. The above drawing of the outline and the computation of the area occupancy rate may be performed artificially, or may be performed mechanically using dedicated processing software or the like. Finally, after the computation operation of the area occupancy rate is repeated for 40 areas, the average value (average area occupancy rate) of the area occupancy rate computed for each area is computed. In such a case, in order to compute the average area occupancy rate by taking into account the distribution tendency of the crystal grains, it is preferable that the coating portion 202 be bisected in the thickness direction and the area occupancy rate be computed for 20 areas each in the inner side portion and the outer side portion.

As described above, when the coating portion 202 is bisected in the thickness direction, the average area occupancy rate may be the same in the inner side portion and the outer side portion, or may be different. In particular, the average area occupancy rate of the crystal grains in the inner side portion is preferably the same as, or larger than, the average area occupancy rate of the crystal grains in the outer side portion (the average area occupancy rate of the inner side portion≥the average area occupancy rate of the outer side portion). This is because it is possible to obtain a greater effect. The same also applies with respect to the average particle diameter. Here, the average area occupancy rate and the average particle diameter in the inner side portion and the outer side portion are respectively set to be computed for 20 areas each as described above.

In addition, the average particle diameter of the crystal grains described above is not particularly limited; however, among these, 55 nm or less is preferable, and 50 nm or less is more preferable. This is because it is possible to obtain a greater effect. The computation procedure of the above average particle diameter is the same as the case of computing the average area occupancy rate except that, after the average particle diameter is computed for each area, the average value (final average particle diameter) of the above average particle diameters is computed. Here, for example, in a case where the particle diameter of the crystal grains is measured, after the outline of the crystal grains is converted into a circle (after a circle having an area equal to the shape defined by the outline of the crystal grains is specified), the diameter of the circle is set as the particle diameter. Similarly to the case where the average area occupancy rate is computed, the computation of the above particle diameter may be artificial or mechanical.

In addition, the average thickness of the coating portion 202 is not particularly limited; however, among these, as thin as possible is preferable, and 1 nm to 3000 nm is more preferable. This is because the core portion 201 occludes and releases lithium ions more easily, and the protective function is exhibited more effectively by the coating portion 202. In detail, when the average thickness is smaller than 1 nm, there is a possibility that it will be difficult for the coating portion 202 to protect the core portion 201. On the other hand, when the average thickness is greater than 3000 nm, the electrical resistance becomes high and there is a possibility that it will be difficult for the core portion 201 to occlude and release lithium ions during charging and discharging. This is because, in a case where the forming material of the coating portion 202 is SiO$_y$, the SiO$_y$ has properties of easily occluding lithium ions while not easily releasing lithium ions once occluded.

The average thickness of the coating portion 202 is computed by the following procedure. First, one piece of the negative electrode active material 200 is observed using SEM or the like. In order to measure the thickness of the coating portion 202, the magnification during the observation is preferably a magnification at which it is possible to visually confirm (determine) the boundary of the core portion 201 and the coating portion 202. Subsequently, after measuring the thickness of the coating portion 202 at 10 arbitrary points, the average value (average thickness T per piece) thereof is computed. In such a case, it is preferable to set the measurement positions so as to be widely dispersed without concentrating in the vicinity of a specific location as much as possible. Subsequently, the computation operation of the above-described average value is repeated until the total number of pieces for observation using SEM reaches 100. Finally, the average value (average value of the average thickness T) of the average values (average thickness T per piece) computed in relation to 100 pieces of the negative electrode active material 200 is computed and set as the average thickness of the coating portion 202.

In addition, the average coating rate of the coating portion 202 with respect to the core portion 201 is not particularly limited; however, it is preferably as large as possible, and here, 30% or more (30% to 100%) is more preferable. This is in order to improve the protective function of the coating portion 202.

The average coating rate of the coating portion 202 is computed by the following procedure. First, similarly to the case where the average thickness was computed, one sample of the negative electrode active material 200 is observed using SEM or the like. The magnification during the observation is preferably a magnification at which it is possible to visually identify the portion coated by the coating portion 202 and the uncoated portion, in the core portion 201. Subsequently, at the outer edge (outline) of the core portion 201, the length of the portion coated by the coating portion 202 and the length of the uncoated portion are measured. Here, the coating rate (coating rate per piece: %)=(length of the portion coated by the coating portion 202/length of the outer edge of the core portion 201)×100 is computed. Subsequently, the computation operation of the above-described coating rate is repeated until the total number of pieces for observation using SEM reaches 100. Finally, the average value of the coating rate (coating rate per piece) computed in relation to 100 pieces of the negative electrode active material 200 is computed and set as the average coating rate of the coating portion 202.

Here, the coating portion 202 is preferably adjacent to the core portion 201; however, a natural oxide film ($SiO_2$) may be interposed between the core portion 201 and coating portion 202. For example, the above natural oxide film is one in which the vicinity of the surface layer of the core portion 201 is oxidized in the atmosphere. If the core portion 201 is present in the center of the negative electrode active material 200 and the coating portion 202 is present at the outer side, the presence of the natural oxide film has hardly any influence on the function of the core portion 201 and the coating portion 202.

Here, in order to confirm that the negative electrode active material 200 includes the core portion 201 and the coating portion 202, in addition to the SEM observation described above, for example, the negative electrode active material 200 may be analyzed using X-ray photoelectron spectroscopy (XPS), energy dispersive X-ray analysis (EDX), or the like.

In such a case, if the degree of oxidation (atom x, y) of the center portion and the surface portion of the negative electrode active material 200 is measured, it is possible to confirm the composition of the core portion 201 and the coating portion 202. Here, in order to investigate the composition of the core portion 201 coated by the coating portion 202, the coating portion 202 may be may be dissolved and removed using an acid such as HF.

For example, a detailed procedure for measuring the degree of oxidation is as follows. First, the negative electrode active material 200 is quantified using a combustion method and the total of the amount of Si and the amount of O is computed. Subsequently, after washing and removing the coating portion 202 using HF or the like, the core portion 201 is quantified using the combustion method and the Si amount and the O amount are computed. Finally, the Si amount and the O amount of the core portion 201 are subtracted from the total of the Si amount and the O amount, and the Si amount and the O amount of the coating portion 202 are computed. In this manner, since the Si amount and the O amount of the core portion 201 are specified, it is possible to specify the degree of oxidation of the core portion 201. Similarly, it is also possible to specify the degree of oxidation of the coating portion 202. Here, instead of washing and removing the coating portion 202, the degree of oxidation may be measured using a core portion 201 coated by the coating portion 202 and an uncoated core portion 201.

Here, in the negative electrode active material layer 2, a plurality of the negative electrode active materials 200 may be mutually separated (dispersed), or two or more of these may be in contact (or linked). In a case where two or more negative electrode active materials 200 are in contact, the positional relationship of the negative electrode active materials 200 may be arbitrary.

In addition, the coating portion 202 includes one or two or more spaces in the inner portion thereof, and is preferably provided with a conductive material in at least a part of the above spaces. That is, it is preferable that the conductive material be inserted into the space, and that the space be filled with the conductive material. This is because the conductivity of the negative electrode active material 200 is improved and, along with this, the decomposition reaction of the electrolytic solution is suppressed without inhibiting the expansion and contraction properties of the coating portion 202 following the expansion and contraction of the core portion 201 described above. For example, the above conductive material preferably includes carbon (C) as a constituent element, and, as specific examples of such a conductive material, there are carbon materials and the like to be described later as "other negative electrode active materials".

In detail, the spaces which are present in the inner portion of the coating portion 202 are used as spaces for relieving the internal stress generated when the negative electrode active material 200 expands and contracts during charging and discharging. For this reason, when the coating portion 202 has spaces, the negative electrode active material 200 is less likely to be damaged during charging and discharging. On the other hand, since the spaces cause the highly reactive coating portion 202 to be exposed in the inner portions thereof, the electrolytic solution is easily decomposed at the exposed surfaces. In relation to this point, when a conductive material is provided in the spaces, since the highly reactive coating portion 202 is not easily exposed in the inner portions of the spaces, the decomposition reaction of the electrolytic solution is suppressed. Moreover, since carbon is excellent in the deformability (flexibility) and high conductivity, the conductive material including carbon as a constituent element does not easily inhibit the expansion and contraction properties of the coating portion 202 following the expansion and contraction of the core portion 201 and, along with this, the conductivity of the coating portion 202 is improved.

Here, the conductive material may include only C as a constituent element, or may also include C and any one type or two or more types of other elements as well. The types of the above "other elements" are not particularly limited; however, for example, there are hydrogen (H), oxygen (O), or the like.

The formation factor of the above-described spaces is not particularly limited. This is because, regardless of the factor at which formation is performed, if spaces are present in the coating portion 202, it is possible for the spaces to fulfil a function as spaces for relieving stress.

The coating portion 202 may be a single layer, or may be multiple layers; however, here, as shown in FIG. 7, multiple layers are preferable. This is because spaces for relieving stress are easily formed in the coating portion 202 (between the layers). The dashed lines shown in FIG. 7 represent the approximate boundary of each layer. However, the coating portion 202 may be multi-layered throughout, or only a part may be multi-layered.

Figure 3A:
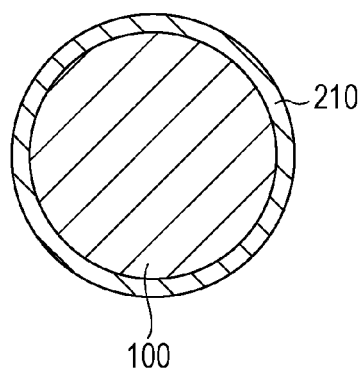
FIGS. 3A and 3B are cross-sectional views schematically representing the configuration of another negative electrode active material which is the active material for a rechargeable battery according to an embodiment of the present application.
Figure 3B:
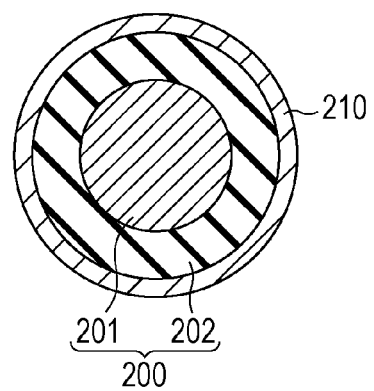

Here, for example, as shown in FIGS. 3A and 3B, it is preferable that a conductive layer 210 be provided on the surface of the negative electrode active materials 100 and 200. This is because the decomposition reaction of the electrolytic solution is suppressed since the highly reactive negative electrode active materials 100 and 200 do not easily come into contact with the electrolytic solution. In addition, this is in order to decrease the electrical resistance of the negative electrode active materials 100 and 200.

The conductive layer 210 may be coated on only a part of the surface of the negative electrode active materials 100 and 200, or may be coated on the entirety thereof. In the former case, the conductive layer 210 may be scattered in a plurality of places on the surface of the negative electrode active materials 100 and 200.

The conductive layer 210 preferably has a lower electrical resistance than the negative electrode active materials 100 and 200, more specifically, C is preferably included as a constituent element. This is because it is possible to obtain a greater effect. Here, in a case where the forming material of the conductive layer 210 is the same as the forming material of the conductive material, the spaces of the coating portion 202 may be filled with a part of the conductive layer 210 instead of the conductive material, and the spaces may be sealed. This is because it is possible to form the conductive material and the conductive layer 210 substantially in one batch.

Here, in general, when the carbon material is measured using the Raman spectrum method, a G band peak derived from a graphite structure is detected in the vicinity of 1590 $cm^{-1}$ and a D band peak derived from a defect is detected in the vicinity of 1350 $cm^{-1}$ in the Raman spectrum. The ratio IG/ID of the strength IG of the G band peak and the strength ID of the D band peak is also referred to as the G/D ratio, and is an index representing the crystallinity (purity) of the carbon material.

The ratio IG/ID of the conductive layer 210 including C as a constituent element is not particularly limited; however, here, 0.3 to 3.2 is preferable and around 2 is more preferable. This is because it is possible to obtain an excellent binding characteristic, conductivity, and deformability.

In detail, since the binding characteristic is increased when the ratio IG/ID is less than 0.3, the adhesion between the conductive layers 210 and the adhesion of the conductive layers with respect to the negative electrode active materials 100 and 200 are improved. However, since the conductivity decreases and hardening occurs, there is a possibility that the conductive layer 210 will not easily expand and contract following the expansion and contraction of the negative electrode active materials 100 and 200 and that sufficient conductivity will not be obtained. On the other hand, since the conductivity is increased and softening occurs when the ratio IG/ID is greater than 3.2, the conductive layer 210 easily expands and contracts following the expansion and contraction of the negative electrode active materials 100 and 200 and, along with this, sufficient conductivity is obtained. However, since the binding property is decreased, there is a possibility that the adhesion between the conductive layers 210 and the adhesion of the conductive layers 210 with respect to the negative electrode active materials 100 and 200 will be decreased. In contrast, if the ratio IG/ID is 0.3 to 3, the adhesion and conductivity of the conductive layer 210 are increased and, along with this, the conductive layer 210 easily expands and contracts following the expansion and contraction of the negative electrode active materials 100 and 200.

In addition, the conductive layer 210 may include C and may also include one type or two or more types of other elements. The types of the above "other elements" are not particularly limited; however, for example, there are H, O, or the like. As specific examples of the forming material of the conductive layer 210, there are carbon materials and the like to be described later as "other negative electrode active materials".

The average thickness of the conductive layer 210 is not particularly limited; however, among these, 200 nm or less is preferable. In addition, the average coating rate of the conductive layer 210 with respect to the negative electrode active materials 100 and 200 is not particularly limited; however, here, it is preferably 30% or more. This is because it is possible to obtain a greater effect. In particular, if the average thickness is greater than 200 nm, since the properties of the slurry including the negative electrode active materials 100 and 200 are deteriorated, there is a possibility that it will become difficult to coat the slurry. Here, the details of the computation procedure of the average coating rate and the average thickness of the conductive layer 210 are the same as for the above-described coating portion 202.

For example, the negative electrode binding agent includes one type or two or more types of any of synthetic rubber, polymer materials, or the like. For example, the synthetic rubber is styrene-butadiene based rubber, fluorine based rubber, ethylene-propylene-diene, or the like. For example, the polymeric material is polyvinylidene fluoride, polyimide, polyamide, polyamide-imide, polyacrylic acid, lithium polyacrylate, sodium polyacrylate, polymaleic acid, copolymers thereof, or the like. Other than these, the polymer material, for example, may be carboxymethylcellulose, styrene-butadiene rubber, polyvinyl alcohol, or the like.

For example, the negative electrode conductive agent includes one type or two or more types of any of carbon material such as graphite, carbon black, acetylene black or Ketjen black. Here, as long as the negative electrode conductive agent is a material having conductivity, it may be a metal material, a conductive polymer, or the like.

Here, according to necessity, the negative electrode active material layer 2 may include the above-described negative electrode active material and, along with this, one type or two or more types of any other types of negative electrode active material.

The "other types of negative electrode active material" include, for example, carbon material. This is because the electrical resistance of the negative electrode active material layer 2 is decreased and, along with this, the negative electrode active material layer 2 does not easily expand and contract during charging and discharging. For example, the above carbon material is easily graphitized carbon, non-easily graphitized carbon of which the inter-surface spacing of the (002) surface is 0.37 nm or more, graphite of which the inter-surface spacing of the (002) surface is 0.34 nm or less, or the like. More specifically, the carbon material is pyrolytic carbon, coke, glassy carbon fiber, an organic polymer compound fired body, activated carbon, a carbon black, or the like. Among these, the cokes include pitch cokes, needle cokes, petroleum cokes, and the like. The organic polymer compound fired body is one in which phenol resin, furan resin, or the like are fired at a suitable temperature and carbonized. The shape of the carbon material may be any of fibrous, spherical, granular or flaky.

In addition, the other negative electrode active materials may be metal oxides or polymer compounds. For example, the metal oxides are iron oxide, ruthenium oxide, molybdenum oxide, and the like. For example, the polymer compounds are polyacetylene, polyaniline, polypyrrole, and the like.

For example, the negative electrode active material layer 2 is formed using a coating method, a firing method (sintering method), or a method combining two or more types of these. For example, the coating method is a coating method dispersing the negative electrode active material in an organic solvent or the like after mixing with a negative electrode binding agent or the like. The firing method is a method of performing heat processing at a higher temperature than the melting point of the negative electrode binding agent after coating is performed using the same procedure as the coating method. It is possible to use a commonly-used method as the firing method. For example, the firing method is an atmosphere firing method, a reaction firing method, a hot press firing method, or the like.

Method of Manufacturing Negative Electrode

The negative electrode is manufactured by the following procedure, for example. Here, since the details have already been given in relation to the forming material of the negative electrode current collector 1 and the negative electrode active material layer 2, description thereof will be omitted.

In a case where the negative electrode active material 100 is used, initially, for example, an Si oxide ($SiO_z$: $0.5 \leq z \leq 1.8$) particulate (powder) is obtained using a gas atomizing method, a water atomizing method, a melting and pulverizing method, or the like. In such a case, the metal material is melted together with the raw material and metal elements such as Fe or the like may be included in the Si oxide. Subsequently, the Si oxide is heated at a high temperature (for example, 1000° C. or less). In this manner, since the surface of the Si oxide undergoes a reduction process and the atomic ratio at the surface is changed, it is possible to obtain the negative electrode active material 100. In such a case, according to necessity, $H_2$ gas or the like may be used. For example, the atomic ratio at the surface of the negative electrode active material 100 is controlled in accordance with the conditions such as the pressure, the heating temperature, and the amount of introduced $H_2$ gas.

In a case where the negative electrode active material 200 is used, initially, for example, a core portion 201 ($SiO_x$: $0 \leq x \leq 0.5$) particulate (powder) is obtained using a gas atomizing method, a water atomizing method, a melting and pulverizing method, or the like. Here, in a case where metal elements such as Fe are included in the core portion 201, the metal material is melted together with the raw material.

Subsequently, for example, by using a vapor phase growth method such as a vapor deposition method or a sputtering method, the coating portion 202 ($SiO_y$: $0.5 \leq y \leq 1.8$) is formed on the surface of the core portion 201. When using such a vapor phase growth method, there is a tendency for the coating portion 202 to easily become non-crystalline. In such a case, by performing a deposition process while heating, or heating after forming the coating portion 202, the coating portion 202 may be made to have low crystallinity. For example, the degree of the low crystallinity is controlled in accordance with the conditions such as the temperature, duration, and the like of the heating. By the above heat processing, the moisture is removed from inside the coating portion 202 and, along with this, the adhesion of the coating portion 202 with respect to the core portion 201 is improved.

Subsequently, using the same procedure as in the case of obtaining the negative electrode active material 100, the coating portion 202 is heated (reduced) at a high temperature (for example, 1000° C. or less), and the atomic ratio at the surface of the coating portion 202 is changed, whereby the negative electrode active material 200 is obtained. For example, the atomic ratio at the surface of the coating portion 202 is controlled in accordance with the conditions such as the pressure, the temperature, and the amount of introduced H2 gas.

In a case where the coating portion 202 is formed, according to necessity, it is preferable to perform the deposition process on the surface of the core portion 201 moving across a plurality of times from several directions by controlling whether or not the deposition process is performed using an opening and closing mechanism such as a shutter while rotating the core portion 201. This is because it is easy to uniformly cover the surface of the core portion 201 using the coating portion 202. In addition, this is because, since the coating portion 202 is multi-layered, spaces for relieving stress are easily formed between the layers.

In a case where the coating portion 202 has spaces, it is preferable that the conductive material be deposited using a thermolysis chemical vapor deposition (CVD) method or the like and that the conductive material be filled in the spaces of the coating portion 202. In a case where the above thermolysis CVD method is used, as the carbon source (organic gas), for example, methane, ethane, ethylene, acetylene, propane, or the like are used. By using the thermolysis CVD method, since the carbon source reaches up to the inner portion of the fine spaces and is thermally decomposed, it is possible to easily fill the fine spaces with the conductive material. As described above, the structure where the conductive material is filled in the fine spaces of the coating portion 202 in this manner is a characteristic structure realized for the first time by forming the conductive material separately from the coating portion 202 using the thermolysis CVD method or the like.

After obtaining the negative electrode active materials 100 and 200, according to necessity, the conductive layer 210 may be formed on the surface of the negative electrode active materials 100 and 200 using a vapor phase growth method, a wet coating method, or the like. For example, the vapor phase growth method is a vapor deposition method, a sputtering method, a thermolysis CVD method, an electron beam deposition method, a sugar carbonization method or the like. Among these, the thermolysis CVD method is preferable. This is because the conductive layer 210 is easily formed with uniform thickness.

For example, when using the vapor deposition method, vapor is directly blown onto the surface of the negative electrode active materials 100 and 200 to form the conductive layer 210. For example, when using the sputtering method, the conductive layer 210 is formed using a powder sputtering method while introducing Ar gas. For example, when using the CVD method, after a gas in which metal chloride is sublimated and a mixed gas of $H_2$, $N_2$, and the like are mixed so that the molar ratio of the metal chloride becomes 0.03 to 0.3, heating (1000° C. or more) is performed and the conductive layer 210 is formed. For example, when using the wet coating method, a metal hydroxide is formed by adding an alkali solution while metal-containing solution to a slurry including the negative electrode active materials 100 and 200. Thereafter, the conductive layer 210 is formed on the surface of the negative electrode active materials 100 and 200 by performing a reduction process (450° C.) using hydrogen. Here, in a case where carbon material is used as the forming material of the conductive layer 210, after the negative electrode active materials 100 and 200 are introduced into the chamber and organic gas is introduced into the chamber, the conductive layer 210 is formed by performing a heating process (10000 Pa, 1000° C. or more×5 hours). The type of organic gas is not particularly limited as long as it generates carbon by thermal decomposition; however, for example, there are methane, ethane, ethylene, acetylene, propane, and the like.

Here, in a case of forming the conductive layer 210, in the forming step, a surface reduction process and a conductive layer 210 forming process may be performed. In such a case, according to necessity, the reduction amount thereof may be controlled by intentionally reducing the reduction operation by changing the surface to $SiO_2$ using an oxidation reaction of hydrogen peroxide and concentrated sulfuric acid.

Subsequently, after the negative electrode active material and the other material such as the negative electrode binding agent are mixed and set as the negative electrode mixture, the mixture is dissolved in a solvent such as an organic solvent and set as a negative electrode mixture slurry. Finally, the negative electrode active material layer 2 is formed by performing drying after coating the negative electrode mixture slurry on the surface of the negative electrode current collector 1. Thereafter, as necessary, the negative electrode active material layer 2 may undergo compressive molding and heating (firing).

Operation and Effect of Negative Electrode

According to the above negative electrode, the negative electrode active material includes Si and O as constituent elements, and the atomic ratio of Si with respect to Si and O is 30 atomic % to 75 atomic % in the surface of the negative electrode active material. In this manner, as described above, since the atomic ratio at the surface of the negative electrode active material is optimized, the smooth occlusion and release of the lithium ions is maintained as it is, an increase in resistance is suppressed, and surface degradation of the Si in cases where the charging and discharging are repeated is also suppressed. Thus, it is possible to improve the performance of the rechargeable battery using the negative electrode.

In particular, as long as the atomic ratio is decreased, or constant, toward the center from the surface of the negative electrode active material in the portion in the vicinity of at least the surface in the negative electrode active materials, it is possible to obtain a greater effect. In addition, as long as the portion in the vicinity of at least the surface in the negative electrode active materials is non-crystalline or low crystalline and the average area occupancy rate of the crystal grains is 35% or less and the average particle diameter is 50 nm or less, it is possible to obtain a greater effect.

In addition, in a case where the atom ratio z of the negative electrode active material satisfies $0.5 \leq z \leq 1.8$, as long as the atomic ratio is gradually decreased toward the center of the negative electrode active material and the atomic ratio in a position 300 nm from the surface of the negative electrode active material toward the center thereof is 35 atomic % to 60 atomic %, it is possible to obtain a greater effect.

In addition, in a case where the negative electrode active material includes the core portion 201 (atom ratio x is $0 \leq x \leq 0.5$) and the coating portion 202 (atom ratio y is $0.5 \leq y \leq 1.8$), as long as the atomic ratio is gradually decreased toward the interface of the core portion 201 and the coating portion 202 from the surface of the negative electrode active material and the atomic ratio at the interface is 30 atomic % to 60 atomic %, it is possible to obtain a greater effect. In such a case, as long as the median diameter (D50) of the core portion 201, the average thickness or the average coating rate of the coating portion 202, the magnitude relation between the average area occupancy and the average particle diameter in the outer portion and the inner portion when the coating portion 202 is bisected in the thickness direction, the average area occupancy rate and the average particle diameter of the crystal grains in the coating portion 202, are in suitable ranges, it is possible to obtain a greater effect.

In addition, as long as the coating portion 202 includes spaces, and the spaces are provided with conductive material, it is possible to obtain a greater effect.

In addition, as long as the conductive layer 210 is provided on the surface of the negative electrode active material, it is possible to obtain a greater effect. In such a case, as long as the conductive layer 210 includes C as a constituent element, and the ratio IG/ID of the conductive layer 210 is 0.3 to 3.2, it is possible to obtain an even greater effect. In addition, as long as the average thickness and the average area occupancy rate of the conductive layer 210 are within suitable ranges, it is possible to obtain a greater effect.

2. Rechargeable Battery

Next, description will be given of a rechargeable battery using the above-described negative electrode for a rechargeable battery.

2-1. Square Type

Figure 8:
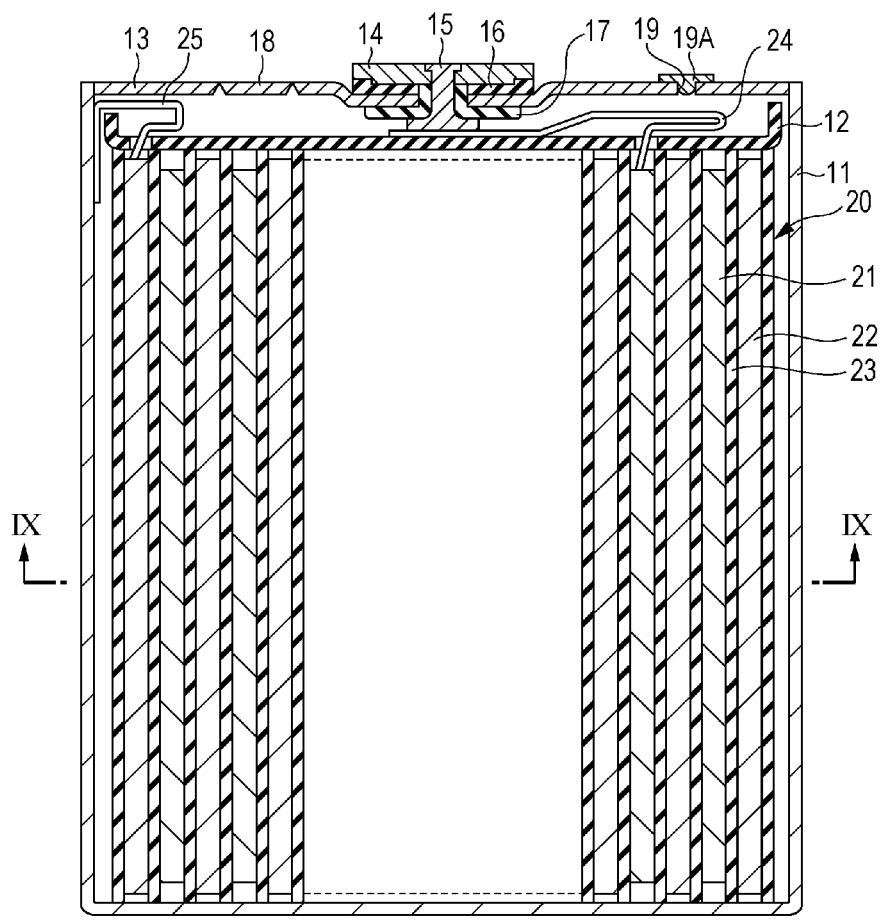
FIG. 8 is a cross-sectional view representing the configuration of a rechargeable battery (square type) according to an embodiment of the present application.
Figure 9:
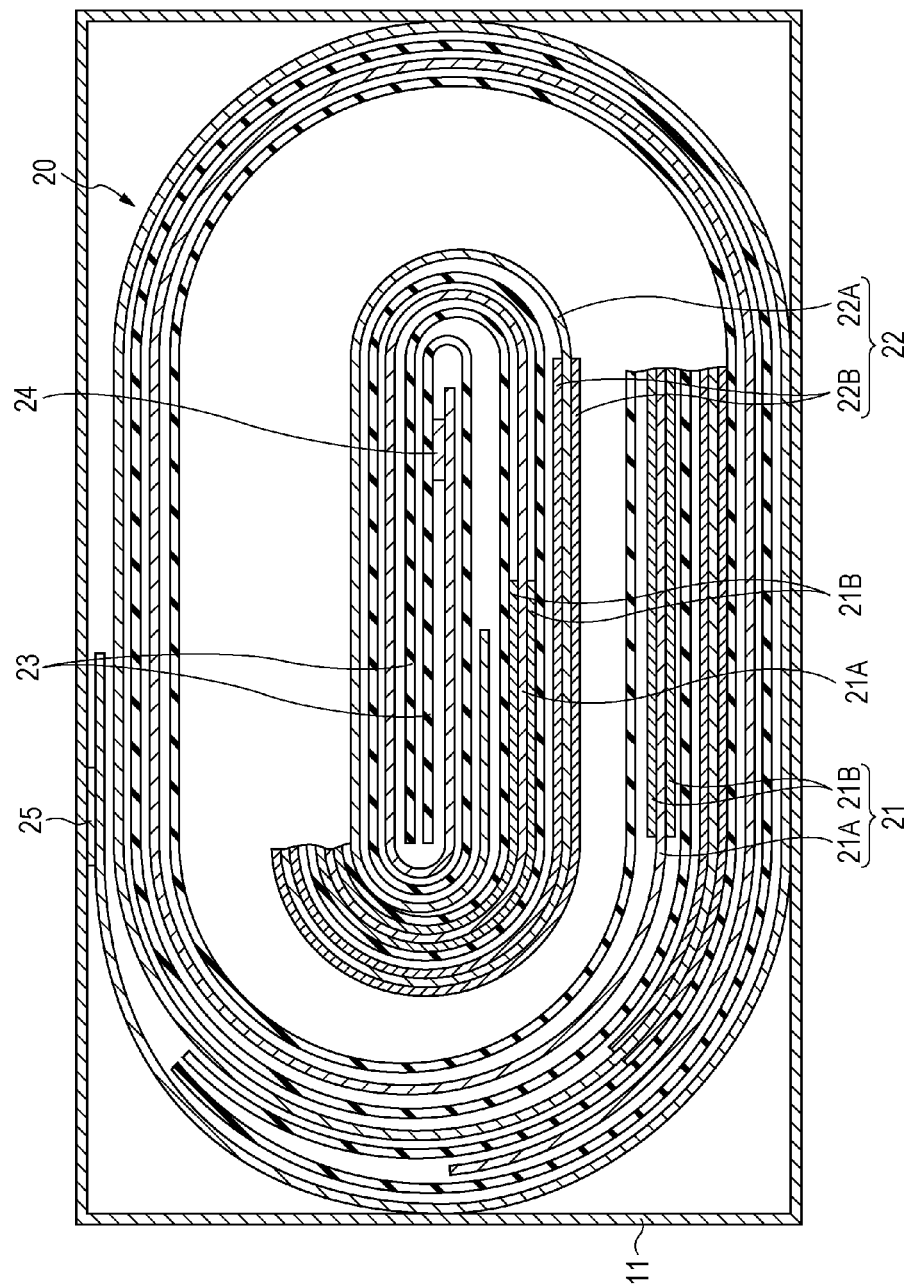
FIG. 9 is a cross-sectional view along the line IX-IX of the rechargeable battery shown in FIG. 8.
Figure 10:
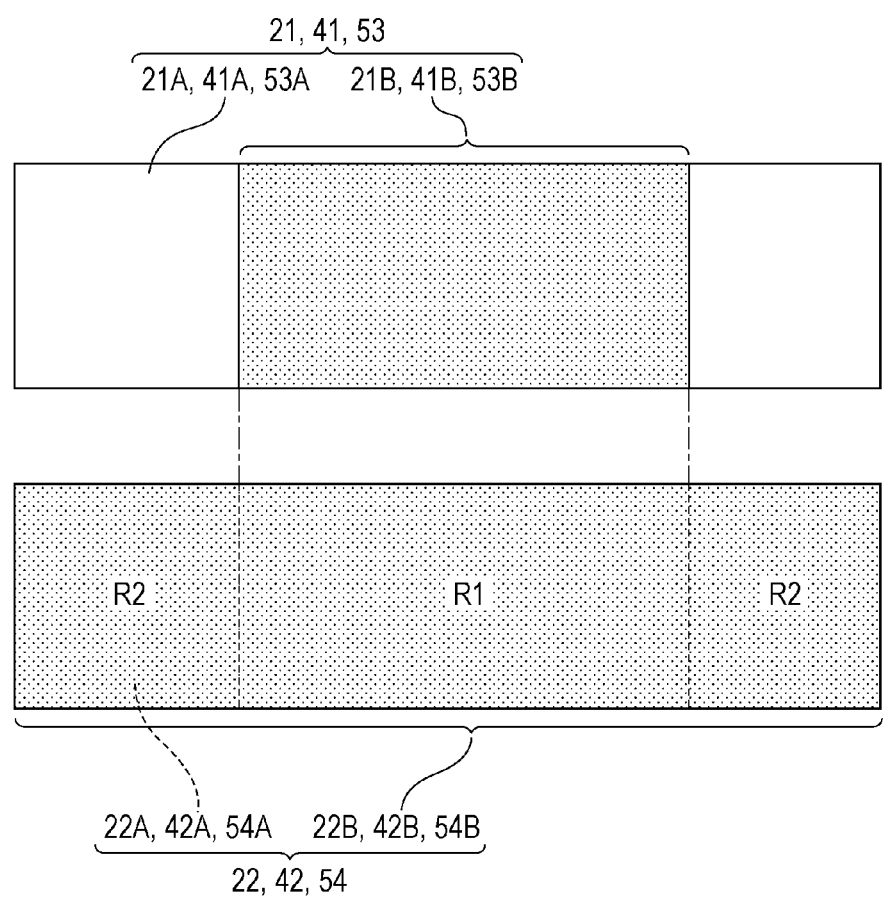
FIG. 10 is a plan view schematically representing the configuration of the positive electrode and the negative electrode shown in FIG. 9.

FIG. 8 and FIG. 9 represent cross-sectional configurations of a square type rechargeable battery, and FIG. 9 shows a cross-section along the line IX-IX shown in FIG. 8. In addition, FIG. 10 schematically represents a planar configuration of a positive electrode 21 and a negative electrode 22 shown in FIG. 9.

Overall Configuration of Rechargeable Battery

The square type rechargeable battery mainly stores a battery element 20 in the inner portion of a battery can 11. The above battery element 20 is a wound and laminated body in which the positive electrode 21 and the negative electrode 22 are laminated and wound through a separator 23, and is made to have a flat form according to the shape of the battery can 11.

For example, the battery can 11 is an external member having a square exterior. As shown in FIG. 9, the member having a square exterior has a cross-section in the longitudinal direction having a rectangular shape or a substantially rectangular shape (including a curve in a part thereof), and is applicable to square type batteries having an oval shape as well as a square shape. That is, the member having a square exterior is a vessel-shaped member of a bottomed rectangular type or a bottomed oval type having an opening portion with a substantially rectangular shape (oval shape) in which a square shape or an arc is connected with a straight line. Here, FIG. 9 shows a case where the battery can 11 has a rectangular cross-sectional shape.

For example, there are cases where the battery can 11 is formed by a conductive material such as Fe, Al or an alloy thereof, and has a function as an electrode terminal. In particular, during charging and discharging, in order to use the solidity (resistance to deformation) to suppress the swelling of the battery can 11, Fe, which is harder than Al, is preferable. Here, in a case where the battery can 11 is made of Fe, Ni or the like may be plated on the surface thereof.

In addition, the battery can 11 has a hollow structure in which one end portion is opened and the other end portion is closed, and is sealed by an insulating plate 12 attached to the open end portion thereof and a battery cover 13. The insulating plate 12 is provided between the battery element 20 and the battery cover 13, and, for example, is formed of insulating material such as polypropylene. For example, battery cover 13 is formed of the same material as the battery can 11, and may function as an electrode terminal in the same manner as the battery can 11.

A terminal plate 14 which is a positive electrode terminal is provided on the outside of the battery cover 13, and the terminal plate 14 is electrically insulated from the battery cover 13 by an insulating case 16. For example, the insulating case 16 is formed of an insulating material such as polybutylene terephthalate. A through hole is provided at the approximate center of the battery cover 13, and a positive electrode pin 15 is inserted into the through hole so as to be electrically connected to the terminal plate 14 and electrically insulated from the battery cover 13 by a gasket 17. For example, the gasket 17 is formed by an insulating material, and asphalt may be coated on the surface of the gasket 17.

In the vicinity of the periphery of the battery cover 13, an opening valve 18 and an injection hole 19 are provided. The opening valve 18 is electrically connected to the battery cover 13, and in a case where the internal pressure of the battery is a set amount or more due to an internal short circuit, heating from the outside, or the like, the internal pressure is released by separation from the battery cover 13. For example, the injection hole 19 is blocked by a sealing member 19A formed of stainless steel balls.

A positive electrode lead 24 formed of a conductive material such as Al is attached to the end portion (for example, inner end portion) of the positive electrode 21 and a negative electrode lead 25 formed of a conductive material such as Ni is attached to the end portion (for example, outer end portion) of the negative electrode 22. The positive electrode lead 24 is welded to one end of the positive electrode pin 15 and electrically connected to the terminal plate 14, and the negative electrode lead 25 is welded to the battery can 11 and electrically connected to the battery can 11.

Positive Electrode

For example, the positive electrode 21 has a positive electrode active material layer 21B on both surfaces of the positive electrode current collector 21A. However, the positive electrode active material layer 21B may be provided on only one side of the positive electrode current collector 21A.

For example, the positive electrode current collector 21A is formed of a conductive material such as Al, Ni, or stainless steel.

The positive electrode active material layer 21B includes any one type or two or more types of positive electrode materials which are capable of occluding and releasing lithium ions as a positive electrode active material, and, according to necessity, may further include other material such as a positive electrode binding agent or a positive electrode conductive agent. Here, for example, the details of the positive electrode binding agent or the positive electrode conductive agent are the same as the previously described negative electrode binding agent and negative electrode conductive agent.

As the positive electrode material, a lithium-containing compound is preferable. This is because it is possible to obtain a high energy density. For example, the lithium-containing compound is a composite oxide including Li and transition metal elements as constituent elements, a phosphate compound including Li and transition metal elements as constituent elements, or the like. Among the above, the transition metal elements are preferably any one type or two or more types of Co, Ni, Mn, and Fe. This is because it is possible to obtain a higher voltage. For example, the chemical formula thereof is represented by $Li_x M11O_2$ or $Li_y M12PO_4$. In the formula, M11 and M12 represent one or more types of transition metal elements. The values of x and y vary depending on the charging and discharging state, and are usually $0.05 \leq x \leq 1.10$, and $0.05 \leq y \leq 1.10$. In particular, when the positive electrode material includes Ni or Mn, there is a tendency for the volume stability ratio to improve.

For example, the composite oxide including Li and transition metal elements is a lithium nickel based composite oxide represented by $Li_xCoO_2$, $Li_xNiO_2$ (x is an arbitrary value) or the following formula (I). For example, the phosphate compound including Li and transition metal elements is $LiFePO_4$, $LiFe_{1-u}Mn_uPO_4$ (u<1), or the like. This is because it is possible to obtain a large battery capacity as well as excellent cycle characteristics. Here, the positive electrode material may be a material other than that described above. For example, the material may be $Li_xM14_yO_2$ (M14 is at least one type from among Ni and M13 shown in formula (1), x>1, and y is arbitrary), or the like.

$LiNi_{1-x}M13_xO_2$ (1) (M13 is at least one type from among Co, Mn, Fe, Al, V, Sn, Mg, Ti, Sr, Ca, Zr, Mo, Tc, Ru, Ta, W, Re, Y, Cu, Zn, Ba, B, Cr, Si, Ga, P, Sb, and Nb, and x satisfies 0.005<x<0.5.)

In addition, for example, the positive electrode material may be an oxide, a disulfide, a chalcogenide, a conductive polymer, or the like. For example, the oxide may be titanium oxide, vanadium oxide, manganese dioxide, or the like. For example, the disulfide may be titanium disulfide, molybdenum sulfide, or the like. For example, the chalcogenide may be niobium selenide, or the like. For example, the conductive polymer may be sulfur, polyaniline, polythiophene, or the like.

Negative Electrode

For example, the negative electrode 22 has the same configuration as the negative electrode for the rechargeable battery described above and has a negative electrode active material layer 22B on both surfaces of the negative electrode current collector 22A. The configurations of the negative electrode current collector 22A and the negative electrode active material layer 22B are the same as those of the negative electrode current collector 1 and the negative electrode active material layer 2 respectively. The chargeable capacity of the negative electrode material capable of occluding and releasing lithium ions is preferably larger than the discharge capacity of the positive electrode 21. This is to prevent the Li metal from being unintentionally deposited during charging and discharging.

As shown in FIG. 10, for example, the positive electrode active material layer 21B is provided on a part (for example, the center region in the longitudinal direction) of the surface of the positive electrode current collector 21A. In contrast, for example, the negative electrode active material layer 22B is provided on the entire surface of the negative electrode current collector 22A. In this manner, the negative electrode active material layer 22B is provided at a region facing the positive electrode active material layer 21B (facing region R1) and a non-facing region (non-facing region R2) in the negative electrode current collector 22A. In such a case, in the negative electrode active material layer 22B, the portion provided in the facing region R1 is involved in the charging, and the portion provided in the non-facing region R2 is hardly involved in the charging. Here, in FIG. 10, the positive electrode active material layer 21B and the negative electrode active material layer 22B are shaded.

As described above, the atomic ratio of the negative electrode active material included in the negative electrode active material layer 22B is within a predetermined range at the surface thereof. However, when the lithium ions move in and out of the negative electrode active material during charging and discharging, the atomic ratio of the negative electrode active material may be changed from the state during the forming of the negative electrode active material layer 22B. However, in the non-facing region R2, there is almost no charging influence, and the forming state of the negative electrode active material layer 22B is maintained as it is. For this reason, in relation to the atomic ratio in the surface of the negative electrode active material, it is preferable to investigate the negative electrode active material layer 22B of the non-facing region R2. This is because it is possible to accurately investigate the atomic ratio in the surface of the negative electrode active material with good reproducibility without depending on the charging history (presence or absence of charging, number of times, and the like). The above also applies with respect to other series of parameters such as the physical properties of the negative electrode active material (the average particle diameter and the average area occupancy of the crystal grains) and the composition thereof (atomic ratios x to z).

The maximum use rate in the fully charged state of the negative electrode 22 (below, simply referred to as "negative electrode use rate") is not particularly limited and may be arbitrarily set according to the ratio of the capacity of the positive electrode 21 and the capacity of the negative electrode 22.

The above-described "negative electrode use rate" is represented by use rate Z (%)=(X/Y)×100. Here, X is the occlusion amount of lithium ions per unit area in the fully charged state of the negative electrode 22, and Y is the amount of lithium ions which are capable of being occluded electrochemically per unit area of the negative electrode 22.

It is possible to determine the occlusion amount X, for example, using the following procedure. First, after the rechargeable battery is charged to reach the fully charged state, the rechargeable battery is dismantled, and the portion (inspection negative electrode) facing the positive electrode 21 in the negative electrode 22 is cut out. Subsequently, using the inspection negative electrode, an evaluation battery is assembled with metal lithium set as a counter electrode. Finally, after discharging the evaluation battery and measuring the discharge capacity during the initial discharge, the occlusion amount X is computed by dividing the discharge capacity by the area of the inspection negative electrode. The "discharge" in the above case signifies current passing in the direction in which the lithium ions are released from the inspection negative electrode, for example, discharging a fixed current until the battery voltage reaches 1.5 V at a current density of 0.1 mA/cm$^2$.

On the other hand, for example, after charging the evaluation battery of which the above-described discharging is completed with a fixed current and a fixed voltage until the battery voltage reaches 0 V and performing measurement of the charging capacity, the occlusion amount Y is computed by dividing the charging capacity thereof with the area of the inspection negative electrode. The "charging" in the above case signifies current passing in the direction in which the lithium ions are occluded from the inspection negative electrode, for example, in fixed voltage charging in which the current density is 0.1 mA/cm$^2$ and the battery voltage is 0 V, performed until the current density reaches 0.02 mA/cm$^2$.

In particular, the negative electrode use rate is preferably 35% to 80%. This is because it is possible to obtain excellent initial charging and discharging characteristics, cycle characteristics, load characteristics and the like.

Separator

The separator 23 separates the positive electrode 21 and the negative electrode 22 and causes lithium ions to pass therethrough while preventing a short circuit of the current due to both electrodes coming into contact. For example, the separator 23 is a porous film formed of synthetic resin or ceramic, and may be a laminated film in which two or more types of porous films are laminated. For example, the synthetic resin may be polytetrafluoroethylene, polypropylene, polyethylene, or the like.

Electrolytic Solution

The separator 23 is impregnated with an electrolytic solution which is a liquid-form electrolyte. The electrolytic solution is one in which an electrolytic solution salt is dissolved in a solvent, and may further include other material such as additives, as necessary.

For example, the solvent includes one type or two or more types of any non-aqueous solvents such as organic solvents. For example, the non-aqueous solvent may be ethylene carbonate, propylene carbonate, butylene carbonate, dimethyl carbonate, diethyl carbonate, ethyl methyl carbonate, methyl propyl carbonate, γ-butyrolactone, γ-valerolactone, 1,2-dimethoxyethane, tetrahydrofuran, 2-methyltetrahydrofuran, tetrahydropyran, 1,3-dioxolane, 4-methyl-1,3-dioxolane, 1,3-dioxane, 1,4-dioxane, methyl acetate, ethyl acetate, methyl propionate, ethyl propionate, methyl butyrate, methyl isobutyrate, trimethyl methyl acetate, trimethyl ethyl acetate, acetonitrile, glutaronitrile, adiponitrile, methoxyacetonitrile, 3-methoxy-propionitrile, N,N-dimethylformamide, N-methylpyrrolidinone, N-methyl oxazolidinone, N,N'-dimethylimidazolidinone, nitromethane, nitroethane, sulfolane, trimethyl phosphate, dimethyl sulfoxide, or the like. This is because it is possible to obtain an excellent battery capacity, cycle characteristics, storage characteristics, and the like.

Among the above, at least one type from among ethylene carbonate, propylene carbonate, dimethyl carbonate, diethyl carbonate, and ethyl methyl carbonate is preferable. This is because it is possible to obtain superior characteristics. In such a case, a combination of a high viscosity (high dielectric constant) solvent (for example, relative dielectric constant ∈≥30) such as ethylene carbonate or propylene carbonate and a low viscosity solvent such as dimethyl carbonate, ethyl methyl carbonate or diethyl carbonate (for example, viscosity≤1 mPa·s) is more preferable. This is because the dissociation of the electrolytic solution salt and the degree of movement of the ions are improved.

In particular, it is preferable that the solvent include an unsaturated cyclic carbonate ester. This is because, since a stable coating is formed on the surface of the negative electrode 22 during charging and discharging, the decomposition reaction of the electrolytic solution is suppressed. The unsaturated cyclic carbonate ester is a cyclic carbonate ester having one or two or more unsaturated carbon bonds. For example, the unsaturated cyclic carbonate ester is vinylene carbonate, vinyl ethylene carbonate, methylene ethylene carbonate, or the like. The content of the unsaturated cyclic carbonate ester in the solvent is not particularly limited; however, for example, it may be 0.01 wt % to 10 wt %.

In addition, the solvent preferably includes a halogenated carbonate ester, that is, at least one from among a halogenated chain carbonate ester and a halogenated cyclic carbonate ester. This is because, since a stable coating is formed on the surface of the negative electrode 22 during charging and discharging, the decomposition reaction of the electrolytic solution is suppressed. The halogenated chain carbonate ester is a chain carbonate ester having halogen as a constituent element, and the halogenated cyclic carbonate ester is a cyclic carbonate ester having a halogen as a constituent element.

The type of halogen is not particularly limited; however, here, F, Cl or Br are preferable, and F is more preferable. This is because it is possible to obtain a greater effect than with the other halogens. However, the number of halogens is more preferably two than one, and, furthermore, may be three or more. This is because, since the ability to form a protective film is increased and a more robust and stable coating is formed, the decomposition reaction of the electrolytic solution is suppressed.

For example, the halogenated chain carbonate ester is fluoromethyl methyl carbonate, bis(fluoromethyl) carbonate, or difluoromethyl methyl carbonate or the like. The halogenated cyclic carbonate ester is 4-fluoro-1,3-dioxolan-2-one; 4,5-difluoro-1,3-dioxolan-2-one; or the like. The halogenated cyclic carbonate ester also includes geometric isomers. The content of the halogenated carbonate ester in the solvent is not particularly limited; however, for example, it may be 0.01 wt % to 50 wt %.

In addition, the solvent preferably includes sultone (cyclic sulfonic acid ester). This is because the chemical stability of the electrolytic solution is improved. For example, the sultone is propane sultone, propene sultone, or the like. The content of the sultone in the solvent is not particularly limited; however, for example, it may be 0.5 wt % to 5 wt %.

In addition, it is preferable that the solvent include an acid anhydride. This is because the chemical stability of the electrolytic solution is improved. For example, the acid anhydride is a carboxylic acid anhydride, a disulfonic acid anhydride, a carboxylic acid sulfonic acid anhydride or the like. For example, the carboxylic acid anhydride is a succinic acid anhydride, a glutaric acid anhydride, a maleic acid anhydride, or the like. For example, the disulfonic acid anhydride is ethane disulfonic anhydride, propane disulfonic acid anhydride or the like. For example, the carboxylic acid sulfonic acid anhydride is sulfo benzoic acid anhydride, sulfo-propionic acid anhydride, sulfo butyric anhydride, or the like. The content of the acid anhydride in the solvent is not particularly limited; however, for example, it may be 0.5 wt % to 5 wt %.

For example, the electrolytic salt includes one type or two or more types of any light metal salts such as lithium salt. For example, the lithium salt is $LiPF_6$, $LiBF_4$, $LiClO_4$, $LiAsF_6$, $LiB(C_6H_5)_4$, $LiCH_3SO_3$, $LiCF_3SO_3$, $LiAlCl_4$, $Li_2SiF_6$, LiCl, LiBr, or the like, and may be another type of lithium salt. This is because it is possible to obtain an excellent battery capacity, cycle characteristics, storage characteristics, and the like.

Among the above, one type or two or more types of any of $LiPF_6$, $LiBF_4$, $LiClO_4$, and $LiAsF_6$ are preferable, $LiPF_6$, or $LiBF_4$ are more preferable, and $LiPF_6$ is even more preferable. This is because, since the resistance of the inner portion is reduced, it is possible to obtain superior characteristics.

It is preferable that the content of the electrolytic salt be from 0.3 mol/kg or more to 3.0 mol/kg or less with respect to the solvent. This is because it is possible to obtain a high ionic conductivity.

Operation of Rechargeable Battery

In the square type rechargeable battery, for example, during charging, the lithium ions released from the positive electrode 21 are occluded by the negative electrode 22 through the electrolytic solution, and, during discharging, the lithium ions released from the negative electrode 22 are occluded by the positive electrode 21 through the electrolytic solution.

In the rechargeable battery, in particular, at least a part in the Si in the negative electrode active material in an uncharged state is preferably alloyed in advance with Li, that is, it is preferable that lithium ions be occluded (in other words, pre-doped) in advance in the negative electrode 22 (negative electrode active material) in the uncharged state. This is because, since the irreversible capacity at the initial time of charging and discharging is reduced, in comparison with a case where pre-doping is not performed, the initial charging and discharging characteristics, cycle characteristics and the like are improved. In relation to the presence or absence of pre-doping, as described with reference to FIG. 10, it is preferable to investigate the negative electrode active material layer 22B of the non-facing region R2.

Method of Manufacturing Rechargeable Battery

For example, the rechargeable battery is manufactured by the following procedure.

In a case of manufacturing the positive electrode 21, first, after setting a positive electrode mixture by mixing the positive electrode active material and, as necessary, the positive electrode binding agent, the positive electrode conductive agent, and the like, dispersion is performed in an organic solvent or the like to form a positive electrode mixture slurry in paste form. Subsequently, the positive electrode active material layer 21B is formed by coating the positive electrode mixture slurry on the positive electrode current collector 21A using a coating apparatus such as a doctor blade or a bar coater and then performing drying. Finally, while performing heating as necessary, the positive electrode active material layer 21B is compression-molded using a roll press machine or the like. In such a case, the compression-molding is repeated a plurality of times.

For example, in a case of manufacturing the negative electrode 22, a negative electrode active material layer 22B is formed on the negative electrode current collector 22A using the same manufacturing procedure as for the above-described negative electrode.

Here, for example, in a case where lithium ions are pre-doped into the negative electrode 22, after mixing the positive electrode active material or the like and Li metal powder, heating (for example, at 500° C.) is performed in an atmosphere of an inert gas (such as Ar gas, for example). Alternatively, for example, after manufacturing the negative electrode 22, Li metal may be deposited on the negative electrode active material layer 22B using a vapor deposition method or the like.

In a case of manufacturing the battery element 20, first, using a welding method or the like, the positive electrode lead 24 is attached to the positive electrode current collector 21A and the negative electrode lead 25 is attached to the negative electrode current collector 22A. Subsequently, after laminating the positive electrode 21 and the negative electrode 22 either side of the separator 23, these are wound in the longitudinal direction. Finally, the wound body is molded so as to have a flat shape.

In a case of assembling the rechargeable battery, first, after accommodating the battery element 20 in the inner portion of the battery can 11, an insulating plate 12 is mounted on the battery element 20. Subsequently, using a welding method or the like, the positive electrode lead 24 is attached to the positive electrode pin 15 and the negative electrode lead 25 is attached to the battery can 11. In such a case, the battery cover 13 is fixed to the open end portion of the battery can 11 using a laser welding method or the like. Finally, after the electrolytic solution was injected inside the battery can 11 from the injection hole 19 and impregnated into the separator 23, the injection hole 19 is closed with the sealing member 19A.

Operation and Effect of Rechargeable Battery

According to the square type rechargeable battery, since the negative electrode 22 adopts the same configuration as the above-described negative electrode, it is possible to obtain excellent battery characteristics. The other effects are the same as the for the negative electrode.

2-2. Cylindrical Type

Figure 11:
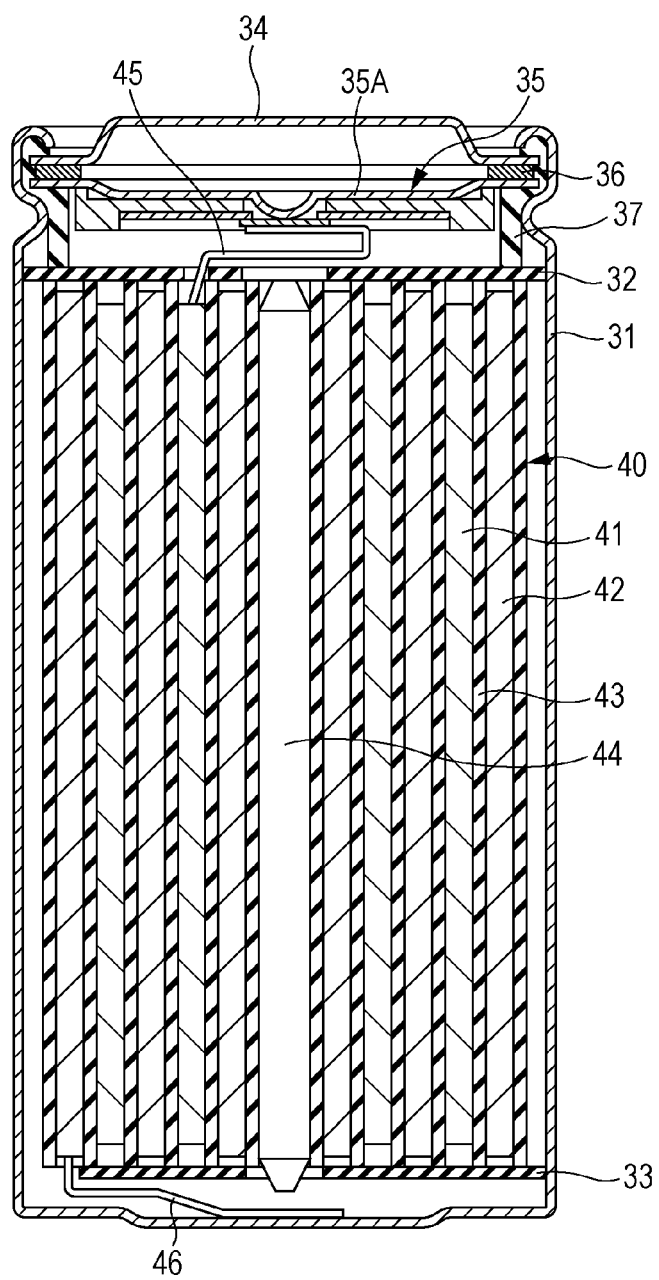
FIG. 11 is a cross-sectional view representing the configuration of a rechargeable battery (cylindrical type) according to an embodiment of the present application.
Figure 12:
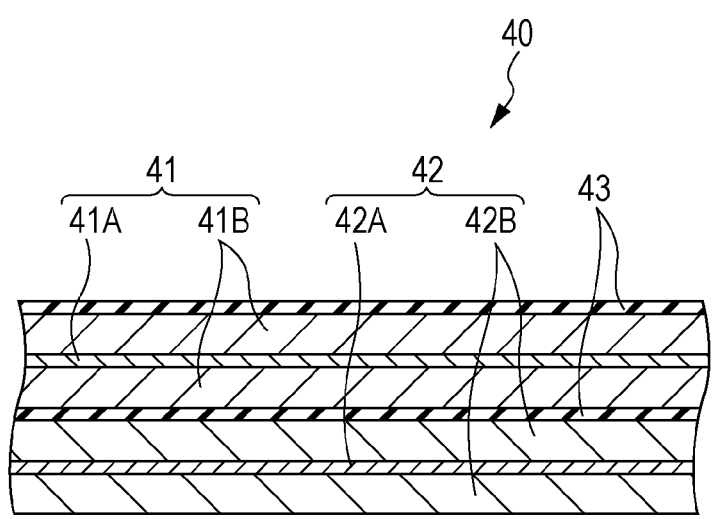
FIG. 12 is a cross-sectional view representing an enlarged part of a spirally wound electrode body shown in FIG. 11.

FIG. 11 and FIG. 12 represent cross-sectional configurations of a cylindrical type rechargeable battery, and FIG. 12 shows an enlarged part of a wound electrode body 40 shown in FIG. 11. Below, the constituent elements of the square type rechargeable battery previously described will be referred to as necessary.

Configuration of Rechargeable Battery

The cylindrical type rechargeable battery mainly accommodates the wound electrode body 40 and a pair of insulating plates 32 and 33 in the inner portion of the battery can 31 having a substantially hollow columnar shape. The wound electrode body 40 is a wound laminate body in which the positive electrode 41 and the negative electrode 42 are laminated and wound either side of the separator 23.

The battery can 31 has a hollow structure in which one end portion is closed and the other end portion is opened, and is formed of the same material as the battery can 11, for example. The pair of insulating plates 32 and 33 interpose the wound electrode body 40 from above and below and are arranged so as to extend perpendicularly with respect to the wound peripheral surface.

In the open end portion of the battery can 31, a battery cover 34, a safety valve mechanism 35 and a heat sensitive resistor (PTC element) 36 are caulked by a gasket 37 and the battery can 31 is sealed. For example, the battery cover 34 is formed of the same material as the battery can 31. The safety valve mechanism 35 and the heat sensitive resistor 36 are provided in the inner portion of the battery cover 34, and the safety valve mechanism 35 is electrically connected to the battery cover 34 through the heat sensitive resistor 36. In the safety valve mechanism 35, in a case where the internal pressure due to an internal short circuit, external heating, or the like is a fixed value or higher, a disk plate 35A is reversed and the electrical connection between the battery cover 34 and the wound electrode body 40 is cut off. The heat sensitive resistor 36 prevents the abnormal generation of heat due to a large current by increasing the resistance according to rises in the temperature. For example, the gasket 37 is formed by an insulating material, and asphalt may be coated on the surface thereof.

A center pin 44 may be inserted in the center of the wound electrode body 40. A positive electrode lead 45 formed of a conductive material such as Al is connected to the positive electrode 41 and a negative electrode lead 46 formed of a conductive material such as Ni is connected to the negative electrode 42. The positive electrode lead 45 is welded or the like to the safety valve mechanism 35 and electrically connected to the battery cover 34. The negative electrode lead 46 is welded or the like to the battery can 31.

For example, the positive electrode 41 has a positive electrode active material layer 41B on both surfaces of the positive electrode current collector 41A. For example, the negative electrode 42 has the same configuration as the negative electrode for the rechargeable battery described above and has a negative electrode active material layer 42B on both surfaces of the negative electrode current collector 42A. The configurations of the positive electrode current collector 41A, the positive electrode active material layer 41B, the negative electrode current collector 42A, the negative electrode active material layer 42B, and the separator 43 are the same as the respective configurations of the positive electrode current collector 21A, the positive electrode active material layer 21B, the negative electrode current collector 22A, the negative electrode active material layer 22B, and the separator 23 respectively. In addition, the composition of the electrolytic solution impregnated in the separator 43 is the same as the composition of the electrolytic solution in the square type rechargeable battery.

Operation of Rechargeable Battery

In the cylindrical type rechargeable battery, for example, during charging, the lithium ions released from the positive electrode 41 are occluded by the negative electrode 42 through the electrolytic solution, and, during discharging, the lithium ions released from the negative electrode 42 are occluded by the positive electrode 41 through the electrolytic solution.

Method of Manufacturing Rechargeable Battery

For example, the cylindrical type rechargeable battery is manufactured by the following procedure. First, for example, using the same manufacturing procedure as for the positive electrode 21 and the negative electrode 22, a positive electrode 41 is manufactured by forming a positive electrode active material layer 41B on both sides of the positive electrode current collector 41A and a negative electrode 42 is manufactured by forming a negative electrode active material layer 42B on both sides of the negative electrode current collector 42A. Subsequently, using a welding method or the like, the positive electrode lead 45 is attached to the positive electrode 41 and the negative electrode lead 46 is attached to the negative electrode 42. Subsequently, after the wound electrode body 40 is manufactured by laminating and winding the positive electrode 41 and the negative electrode 42 on either side of the separator 43, a center pin 44 is inserted into the center of the winding. Subsequently, the wound electrode body 40 is accommodated in the inner portion of the battery can 31 while being interposed by a pair of insulating plates 32 and 33. In such a case, using a welding method or the like, the positive electrode lead 45 is attached to safety valve mechanism 35 and the leading portion of the negative electrode lead 46 is attached to the battery can 31. Subsequently, an electrolytic solution is injected into the inner portion of the battery can 31 and impregnated into the separator 43. Finally, after the battery cover 34, the safety valve mechanism 35 and the heat sensitive resistor 36 are attached to the opening end portion of the battery can 31, caulking is performed thereon using a gasket 37.

Operation and Effect of Rechargeable Battery

According to the cylindrical type rechargeable battery, since the negative electrode 42 adopts the same configuration as the above-described negative electrode, it is possible to obtain the same effect as the square type rechargeable battery.

2-3. Laminated Film Type

Figure 13:
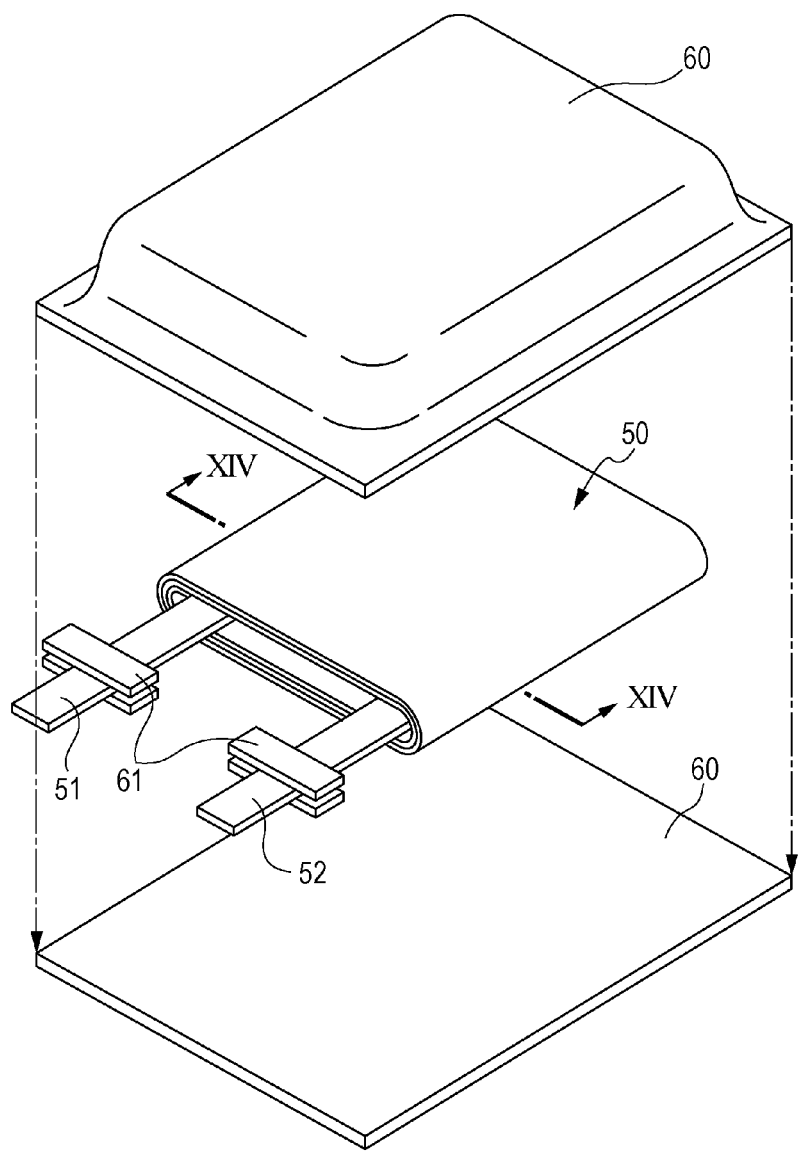
FIG. 13 is an exploded perspective view representing the configuration of a rechargeable battery (laminated film type) according to an embodiment of the present application.
Figure 14:
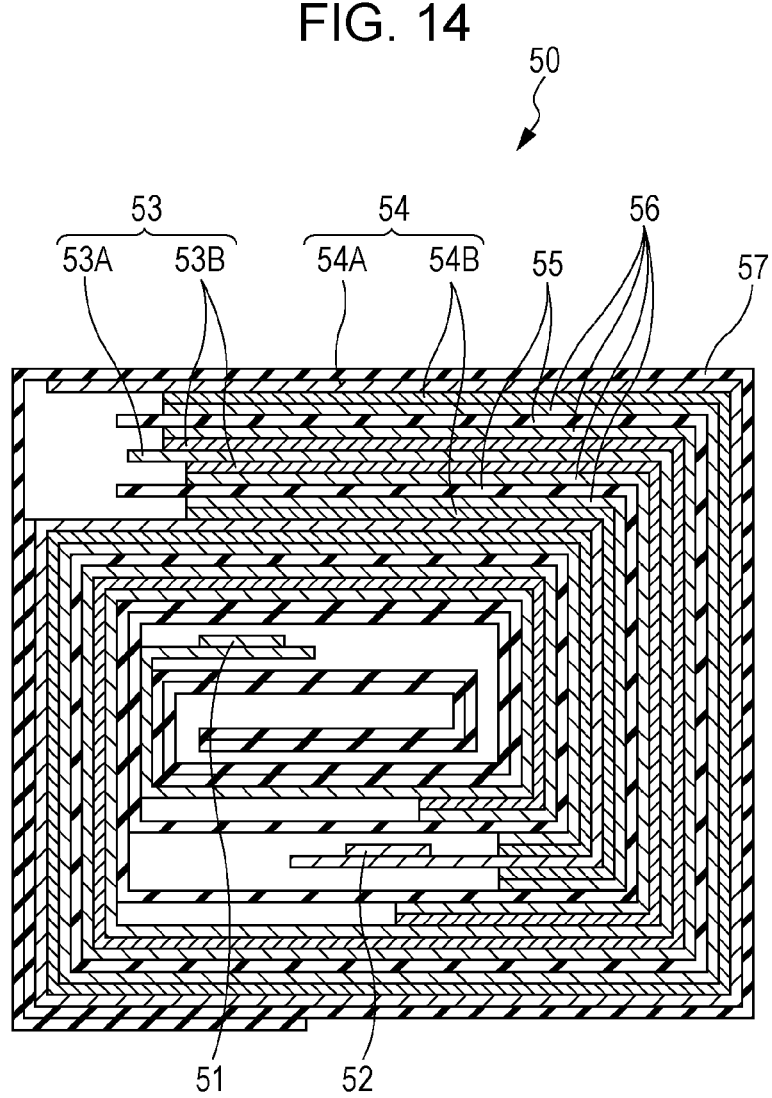
FIG. 14 is a cross-sectional view along the line XIX-XIX of the spirally wound electrode body shown in FIG. 13.

FIG. 13 represents an exploded perspective view of laminated film type rechargeable battery, and FIG. 14 shows an enlarged cross-section along the line XIV-XIV of the wound electrode body 50 shown in FIG. 13.

Configuration of Rechargeable Battery

The laminated film type rechargeable battery mainly accommodates the wound electrode body 50 in the inner portion of a film-shaped external member 60. The wound electrode body 50 is a wound laminate body in which a positive electrode 53 and a negative electrode 54 are laminated and wound either side of a separator 55 and an electrolyte layer 56. The positive electrode lead 51 is attached to the positive electrode 53 and the negative electrode lead 52 is attached to the negative electrode 54. The outermost peripheral portion of the wound electrode body 50 is protected by a protective tape 57.

For example, the positive electrode lead 51 and the negative electrode lead 52 are derived in the same direction from the inner portion of the external member 60 to the outer portion. The positive electrode lead 51 is formed, for example, of a conductive material such as Al and the negative electrode lead 52 is formed, for example, of a conductive material such as Cu, Ni, or stainless steel. For example, the above materials have a thin plate shape or a mesh shape.

For example, the external member 60 is a laminated film in which a bonding layer, a metal layer, and a surface protection layer are laminated in this order. For example, in the laminated film, the outer peripheral edge portions in the bonding layer of the two films are stuck together by bonding, adhesive, or the like such that the bonding layer corresponds to the wound electrode body 50. For example, the bonding layer is a film of polyethylene, polypropylene or the like. For example, the metal layer is an Al foil or the like. For example, the surface protective layer is a film of nylon, polyethylene terephthalate or the like.

Among these, as the external member 60, an aluminum laminate film in which polyethylene film, aluminum foil, and nylon film, are laminated in this order is preferable. However, the external member 60 may be a laminated film having another laminated structure, or may be a polymer film such as polypropylene or a metal film.

Between the external member 60 and the positive electrode lead 51, and the negative electrode lead 52, an adhesive film 61 for preventing the intrusion of outside air is inserted. The adhesive film 61 is formed of a material having adhesion with respect to the positive electrode lead 51 and the negative electrode lead 52. For example, such material is a polyolefin resin such as polyethylene, polypropylene, modified polyethylene or modified polypropylene.

For example, the positive electrode 53 has a positive electrode active material layer 53B on both surfaces of the positive electrode current collector 53A. For example, the negative electrode 54 has the same configuration as the negative electrode for the rechargeable battery described above and has a negative electrode active material layer 54B on both surfaces of the negative electrode current collector 54A. The configurations of the positive electrode current collector 53A, the positive electrode active material layer 53B, the negative electrode current collector 54A and the negative electrode active material layer 54B are the same as the respective configurations of the positive electrode current collector 21A, the positive electrode active material layer 21B, the negative electrode current collector 22A and the negative electrode active material layer 22B respectively. In addition, the configuration of the separator 55 is the same as the configuration of the separator 23.

The electrolyte layer 56 is one in which an electrolytic solution is held using a polymer compound, and may further include other material such as additives, as necessary. The electrolyte layer 56 is a so-called gel electrolyte. The gel electrolyte is preferably one which is capable of obtaining a high ionic conductivity (for example, 1 mS/cm or more at room temperature) and which prevents the leakage of the electrolytic solution.

For example, the polymer compound preferably includes one type or two or more types of any of polyacrylonitrile, polyvinylidene fluoride, polytetrafluoroethylene, poly-hexafluoropropylene, polyethylene oxide, polypropylene oxide, polyphosphazene, polysiloxane, polyvinyl fluoride, polyvinyl acetate, polyvinyl alcohol, polymethyl methacrylate, polyacrylic acid, polymethacrylic acid, styrene-butadiene rubber, nitrile butadiene rubber, polystyrene, polycarbonate, a copolymer of vinylidene fluoride and hexafluoropyrene, and the like. Among these, polyvinylidene fluoride or a copolymer of vinylidene fluoride and hexafluoropyrene is preferable. This is because they are electrochemically stable.

For example, the composition of the electrolytic solution is the same as the composition of the electrolytic solution in the square type rechargeable battery. However, in the electrolyte layer 56 which is a gel electrolyte, the solvent of the electrolytic solution is a wide concept including not only liquid solvents, but also materials having ion conductivity capable of dissociating the electrolyte salt. For this reason, in the case of using a polymer compound having ion conductivity, the polymer compound is also included in the solvent.

Here, instead of the gel electrolyte layer 56, an electrolytic solution may be used. In such a case, the electrolytic solution is impregnated in the separator 55.

Operation of Rechargeable Battery

In the laminated film type rechargeable battery, for example, during charging, the lithium ions released from the positive electrode 53 are occluded by the negative electrode 54 through the electrolyte layer 56. In addition, for example, during discharging, the lithium ions released from the negative electrode 54 are occluded by the positive electrode 53 through the electrolyte layer 56.

Method of Manufacturing Rechargeable Battery

For example, the laminated film type rechargeable battery provided with the gel electrolyte layer 56 is manufactured by the following three types of procedures.

In the first procedure, first, the positive electrode 53 and the negative electrode 54 are manufactured according to the same manufacturing procedure as the positive electrode 21 and the negative electrode 22. In such a case, a positive electrode 53 is manufactured by forming a positive electrode active material layer 53B on both sides of the positive electrode current collector 53A and a negative electrode 54 is manufactured by forming a negative electrode active material layer 54B on both sides of the negative electrode current collector 54A. Subsequently, after preparing a precursor solution including an electrolytic solution, a polymer compound, an organic solvent, and the like, the precursor solution is coated on the positive electrode 53 and the negative electrode 54 to form a gel electrolyte layer 56. Subsequently, using a welding method or the like, the positive electrode lead 51 is attached to the positive electrode current collector 53A and the negative electrode lead 52 is attached to the negative electrode current collector 54A. Subsequently, after the wound electrode body 50 is manufactured by laminating and winding the positive electrode 53 and the negative electrode 54 formed by the electrolyte layer 56 on either side of the separator 55, a protective tape 57 is adhered to the outermost peripheral portion thereof. Finally, after interposing the wound electrode body 50 in the external member 60 having the shape of two films, the outermost peripheral edge portions of the external member 60 are bonded together using a method such as thermal fusion, and the wound electrode body 50 is enclosed in the external member 60. In such a case, an adhesive film 61 is inserted between the positive electrode lead 51 and the negative electrode lead 52, and the external member 60.

In the second procedure, first, the positive electrode lead 51 is attached to the positive electrode 53 and the negative electrode lead 52 is attached to the negative electrode 54. Subsequently, after a wound body, which is a precursor of the wound electrode body 50 is manufactured by laminating and winding the positive electrode 53 and the negative electrode 54 on either side of the separator 55, a protective tape 57 is adhered to the outermost peripheral portion thereof. Subsequently, after interposing the wound body in the external member 60 having the shape of two films, the outermost peripheral edge portions of the external member 60 other than one side of the outermost peripheral edge portion are bonded using a method such as thermal fusion, and the wound body is accommodated in the inner portion of the bag-like external member 60. Subsequently, after preparing a composition for an electrolyte including an electrolytic solution, monomers which are the raw materials of a polymer compound, a polymerization initiator, and other materials such as a polymerization inhibitor as necessary and injecting this into the inner portion of the bag-like external member 60, the opening portion of the external member 60 is sealed using a method such as thermal fusion. Finally, the monomers undergo thermal polymerization to become the polymer compound, and the gel electrolyte layer 56 is formed.

In the third procedure, first, in the same manner as the above-described second procedure except that a separator 55 in which the polymer compound is coated on both surfaces is used, the wound body is manufactured and accommodated in the inner portion of the bag-like external member 60. For example, the polymer compound coated on the separator 55 is a copolymer (homopolymer, copolymer, or multi-component copolymer) in which vinylidene fluoride is set as a component or the like. Specifically, the polymer compound is a binary copolymer, in which polyvinylidene fluoride, vinylidene fluoride and hexafluoropropylene are set as components, or a ternary copolymer, in which vinylidene fluoride, hexafluoropropylene, and chlorotrifluoroethylene are set as components, or the like. Here, together with the copolymer in which vinylidene fluoride is set as a component, one type or two or more types of other polymer compounds may be used. Subsequently, after preparing an electrolytic solution and injecting this into the inner portion of the external member 60, the opening portion of the external member 60 is sealed using a method such as thermal fusion. Finally, by heating while applying a weight to the external member 60, the separator 55 is adhered to the positive electrode 53 and the negative electrode 54 through the polymer compound. In this manner, since the electrolytic solution is impregnated into the polymer compound, the polymer compound is gelled to form the electrolyte layer 56.

In this third procedure, battery swelling is suppressed to a greater extent than in the first procedure. In addition, in comparison with the second procedure, hardly any of the monomers which are the raw materials of the polymer compound, the organic solvent, and the like remain in the electrolyte layer 56, whereby the forming processes of the polymer compound are favorably controlled. In this manner, the positive electrode 53, the negative electrode 54, and the separator 55 are sufficiently adhered to the electrolyte layer 56.

Operation and Effect of Rechargeable Battery

According to the laminate film type rechargeable battery, since the negative electrode 54 adopts the same configuration as the above-described negative electrode, it is possible to obtain the same effect as the square type rechargeable battery.

3. Uses of Rechargeable Battery

Next, description will be given of application examples of the above-described rechargeable battery.

The uses of the rechargeable battery are not particularly limited as long as it is used in a machine, apparatus, appliance, device, system (collection of a plurality of apparatuses or the like), or the like, which are capable of using the battery as a driving power source, or a power storage source for storing electricity. In a case where the rechargeable battery is used as a power source, the battery may be a main power source (power source used as a priority), or an auxiliary power source (power source used instead of the main power source or when switching from the main power source). The type of the main power source in the latter case is not limited to the rechargeable battery.

Examples of the uses of the rechargeable battery include uses such as the following. Such examples include portable electronic apparatuses such as video cameras, digital still cameras, mobile phones, notebook computers, cordless phones, headphone stereos, portable radios, portable televisions, portable information terminals or the like. However, the uses of the electronic apparatus are not limited to portable devices. It may be a portable appliance for daily life, such as an electric shaver. It may be a storage device such as a backup power source, or a memory card. It may be a power tool, such as an electric drill or an electric saw. It may be a battery pack used as a power source of a notebook computer or the like. It may be an electronic apparatus for medical use such as a pacemaker or a hearing aid. It may be an electric vehicle such as an electric car (including hybrid vehicles). It may be a power storage system such as a battery system for home use accumulating power in preparation for emergencies or the like. Naturally, uses other than the above are not excluded.

In particular, the rechargeable battery may be effectively applied to the battery pack, the electric vehicle, the power storage system, the power tools, the electronic apparatus and the like. This is because, since excellent battery characteristics are demanded, by using the rechargeable battery according to an embodiment of the present application, it is possible to obtain an effective improvement in the characteristics. Here, the battery pack is a power source using the rechargeable battery, in other words, an assembled battery. The electric vehicle operates (travels) as with the rechargeable battery as a power source for driving, and, as described above, may be a car (hybrid car or the like) also provided with a driving source other than the rechargeable battery. The power storage system is a system using the rechargeable battery as a power storage source. For example, in a power storage system for home use, power is stored in the rechargeable battery which is the power storage source, and, since this power is consumes when necessary, it is available for home electrical appliances and the like. The power tool is a tool which is capable of moving movable parts (for example, a drill or the like) with the rechargeable battery as a driving power source. The electronic apparatus is an apparatus exhibiting various functions with the rechargeable battery as a driving power source.

Here, specific description will be given of several application examples of the rechargeable battery. Here, since the configurations of each application example described below is simply an example, appropriate changes may be made thereto.

3-1. Battery Pack

Figure 15:
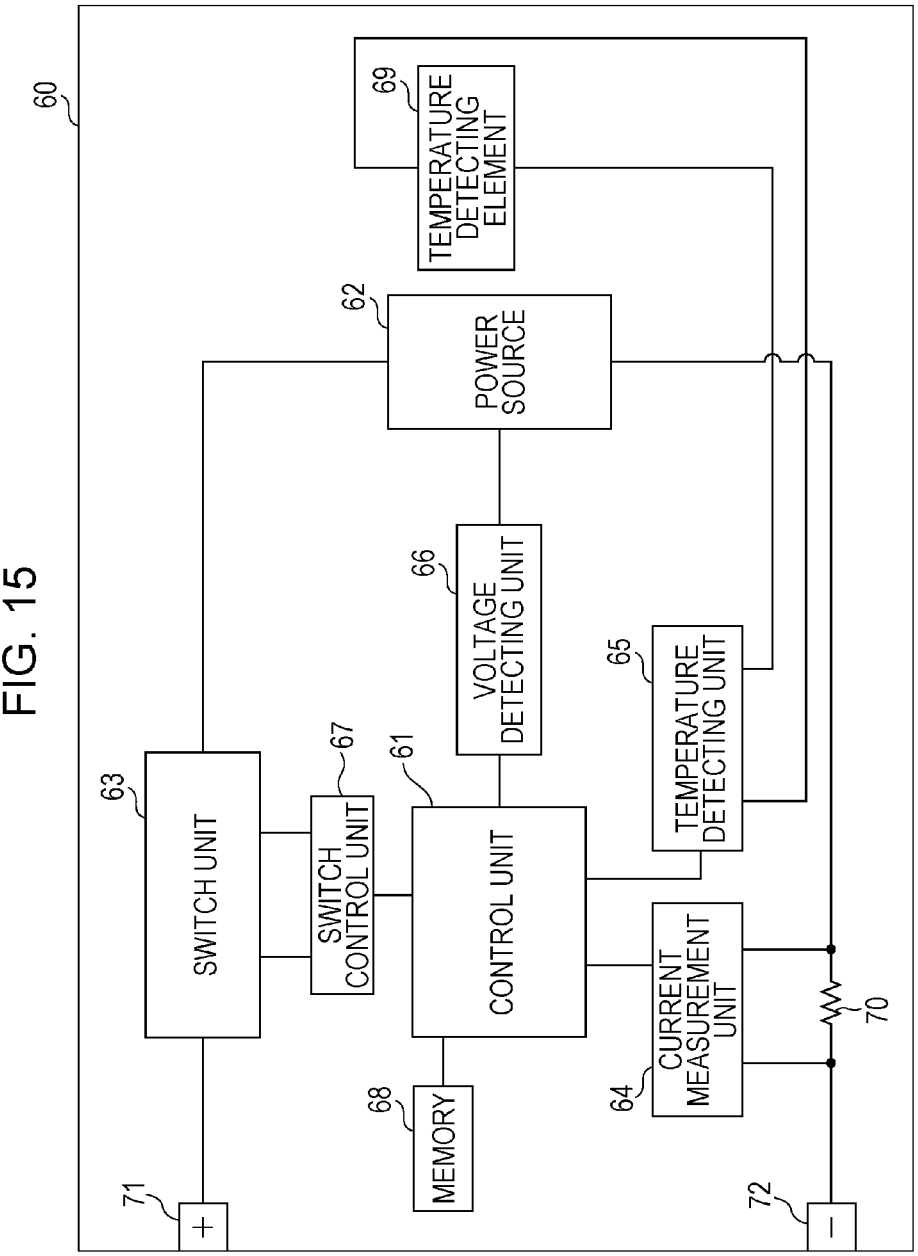
FIG. 15 is a block diagram representing a configuration of an application example (battery pack) of the rechargeable battery.

FIG. 15 represents a block configuration of a battery pack. For example, as shown in FIG. 15, in the inner portion of a housing 60 formed of plastic material or the like, the battery pack is provided with a control unit 61, a power source 62, a switch unit 63, a current measurement unit 64, a temperature detection unit 65, a voltage detection unit 66, a switch control unit 67, a memory 68, a temperature detection element 69, a current detection resistor 70, a positive electrode terminal 71, and a negative electrode terminal 72.

The control unit 61 controls the operation (including the use state of the power source 62) of the entire battery pack, for example, including a central processing unit (CPU) or the like. The power source 62 includes one or two or more rechargeable batteries (not shown). For example, the power source 62 may be an assembled battery including two or more rechargeable batteries, which may be connected in series, in parallel, or a mixture of both types. By way of example, the power source 62 may include six rechargeable batteries connected in two parallel rows of three in series.

The switch unit 63 switches the use state (whether or not the power source 62 and an external apparatus are connected) of the power source 62 according to instructions from the control unit 61. For example, the switch unit 63 includes a charging control switch, a discharging control switch, a charging diode, and a discharging diode (not shown) and the like. For example, the charging control switch and the discharging control switch are semiconductor switches such as field effect transistors (MOSFET) using metal oxide semiconductors.

The current measurement unit 64 measures the current using the current detection resistor 70, and outputs the measurement result to the control unit 61. The temperature detection unit 65 measures the temperature using the temperature detection element 69 and is set to output the measurement result to the control unit 61. For example, this temperature measurement result is used in a case where the control unit 61 performs charging and discharging control during abnormal heat generation, or for performing a correction process when the control unit 61 computes the remaining capacity. The voltage detection unit 66 measures the voltage of the rechargeable battery in the power source 62, converts the measured voltage using analog/digital (A/D) conversion, and performs supply thereof to the control unit 61.

The switch control unit 67 controls the operation of the switch unit 63 according to signals input from the current measurement unit 64 and the voltage detection unit 66.

For example, in a case where the battery voltage reaches the overcharge detection voltage, the switch control unit 67 is set to cut off the switch unit 63 (charging control switch), and perform control such that charging current does not flow in the current path of the power source 62. In this manner, in the power source 62, discharging is possible only through the discharging diode. Here, for example, in a case where a large current flows during charging, the switch control unit 67 is set to interrupt the charging current.

In addition, for example, in a case where the battery voltage reaches the overdischarge detection voltage, the switch control unit 67 is set to cut off the switch unit 63 (discharging control switch), and perform control such that discharging current does not flow in the current path of the power source 62. In this manner, in the power source 62, charging is possible only through the charging diode. Here, for example, in a case where a large current flows during discharging, the switch control unit 67 is set to interrupt the discharging current.

Here, for example, in the rechargeable battery, the overcharge detection voltage is 4.20 V±0.05 V, and the overdischarge detection voltage is 2.4 V±0.1 V.

For example, the memory 68 is an EEPROM or the like, which is a non-volatile memory. For example, numerical values calculated by the control unit 61 and information (for example, the internal resistance of the initial state, and the like) about the rechargeable battery measured during the stages of the manufacturing process are stored in the memory 68. Here, if the full charge capacity of the rechargeable battery is stored in the memory 68, the control unit 61 is capable of grasping information such as the remaining capacity and the like.

The temperature detection element 69 measures the temperature of the power source 62 and outputs the measurement result to the control unit 61, and is a thermistor or the like.

The positive electrode terminal 71 and the negative electrode terminal 72 are terminals connected to external apparatuses (for example, notebook personal computers and the like) operated by using a battery pack, or external apparatuses (for example, chargers or the like) used for charging the battery pack. The charging and discharging of the power source 62 is performed through the positive electrode terminal 71 and the negative electrode terminal 72.

3-2. Electric Vehicle

Figure 16:
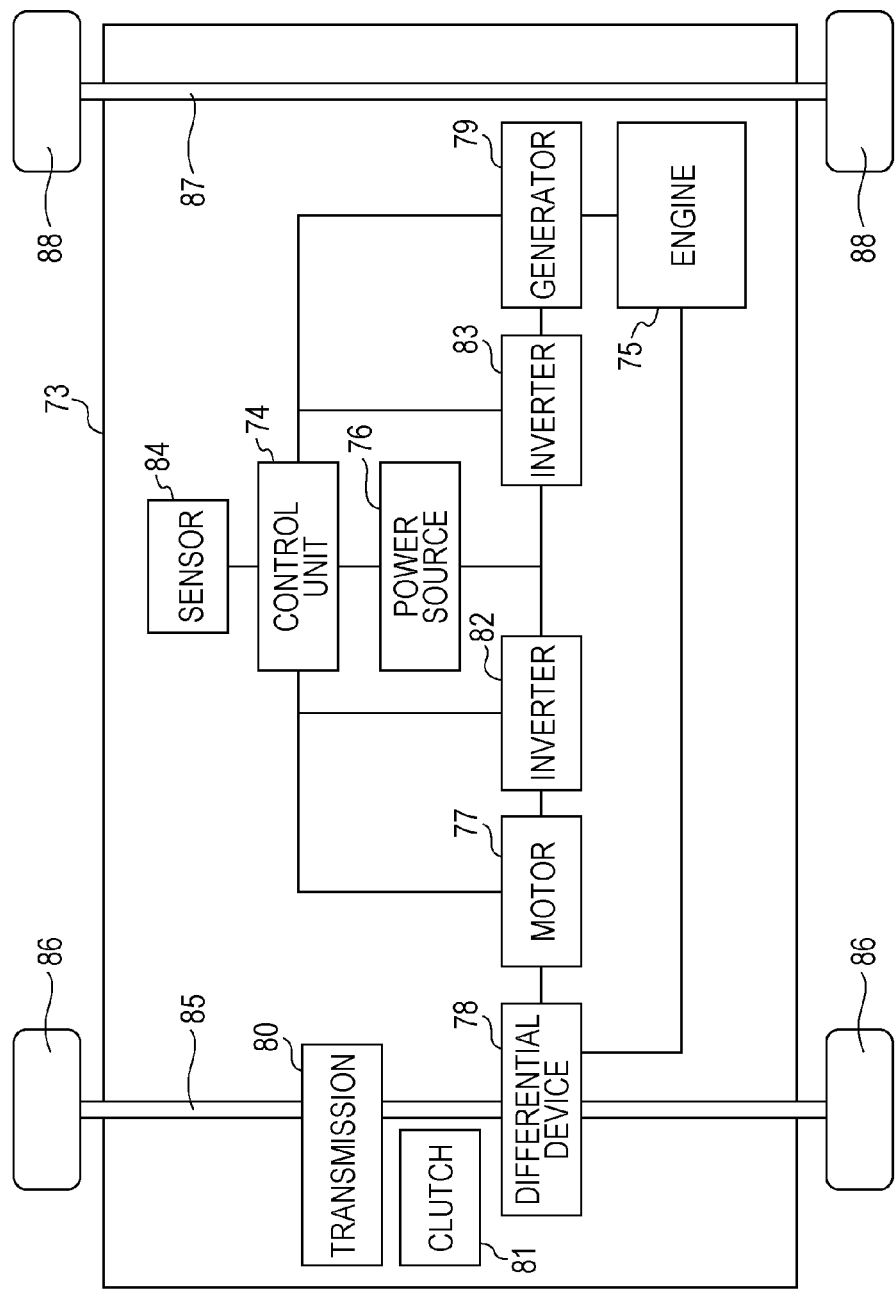
FIG. 16 is a block diagram representing a configuration of an application example (electric vehicle) of the rechargeable battery.

FIG. 16 represents a block configuration of a hybrid car which is an example of an electric vehicle. For example, as shown in FIG. 16, in the inner portion of the housing 73 made of metal, the electric vehicle is provided with a control unit 74, an engine 75, a power source 76, a driving motor 77, a differential apparatus 78, a generator 79, a transmission 80 and a clutch 81, inverters 82 and 83, and various types of sensor 84. In addition, for example, the electric vehicle is provided with a front-wheel drive shaft 85 and front wheel 86 connected to the differential apparatus 78 and the transmission 80, and a rear wheel drive shaft 87 and a rear wheel 88.

This electric vehicle is capable of traveling with either of the engine 75 or the motor 77 as a driving source. The engine 75 is the main power source, for example, a gasoline engine or the like. In a case where the engine 75 is set as a power source, for example, the driving force (rotational force) of the engine 75 is transmitted to the front wheel 86 and the rear wheel 88 through the differential apparatus 78, the transmission 80, and the clutch 81, which are driving parts. Here, the rotational force of the engine 75 is also transmitted to the generator 79, whereby the generator 79 generates AC power according to the rotational force, and, along with this, the AC power is converted to DC power through the inverter 83, and stored in the power source 76. On the other hand, in a case where the motor 77 which is a conversion unit is set as the power source, the power (DC power) supplied from the power source 76 is converted to AC power through the inverter 82 and the motor 77 is driven according to the AC power. For example, the driving force (rotational force) converted from the electric power by the motor 77 is transmitted to the front wheel 86 and the rear wheel 88 through the differential apparatus 78, the transmission 80, and the clutch 81, which are driving parts.

Here, if the electric vehicle is decelerated by a braking mechanism (not shown), the resistance during the deceleration is transmitted to the motor 77 as rotational force, and the motor 77 may be set to generate AC power according to the rotational force. It is preferable that this AC power be converted to DC power through the inverter 82, and that the DC regenerated power be stored in the power source 76.

The control unit 74 controls the operation of the entire electric vehicle and, for example, includes a CPU or the like. The power source 76 includes one or two or more rechargeable batteries (not shown). The power source 76 may be capable of storing power by being connected to an external power source, and receiving a power supply from the external power source. For example, the various types of sensors 84 may be used in order to control the number of rotations of the engine 75 and to control the opening degree (throttle opening) of the throttle valve (not shown). For example, these various types of sensors 84 include a speed sensor, an acceleration sensor, an engine rotation number sensor, and the like.

Here, in the above description, description has been given of a hybrid car as an electric vehicle; however, the electric vehicle may be a vehicle (electric car) operated using only the power source 76 and the motor 77 without using the engine 75.

3-3. Power Storage System

Figure 17:
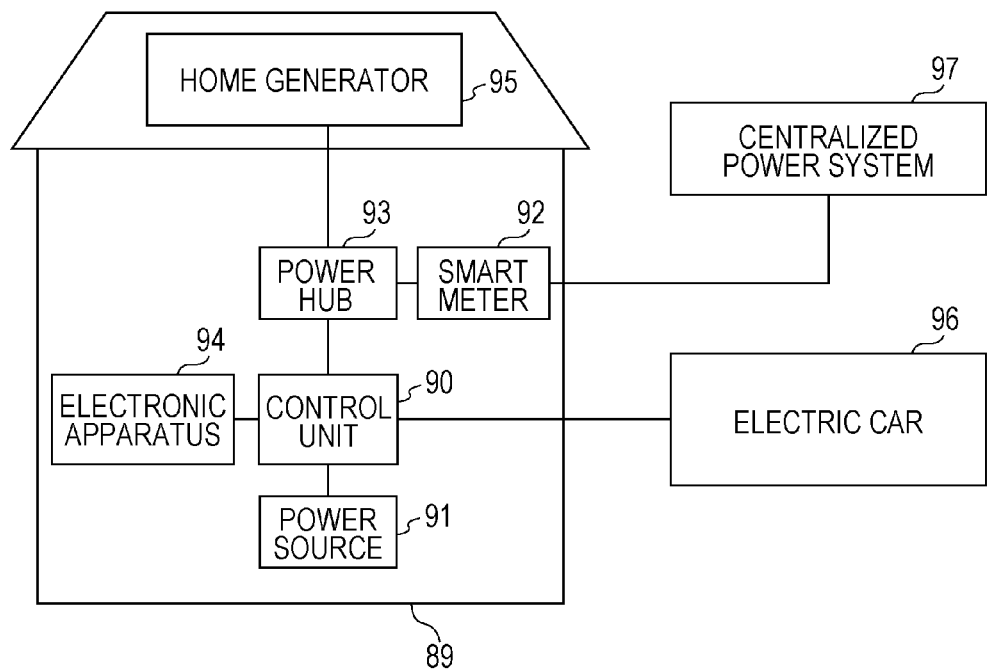
FIG. 17 is a block diagram representing a configuration of an application example (power storage system) of the rechargeable battery.

FIG. 17 represents a block configuration of a power storage system. For example, as shown in FIG. 17, in the inner portion of a house 89 such as a normal residential home or a commercial building, the power storage system is provided with a control unit 90, a power source 91, a smart meter 92, and a power hub 93.

Here, for example, the power source 91 is connected to an electrical apparatus 94 located in the inner portion of the house 89 and, along with this, is capable of being connected to an electric vehicle 96 parked outside the house 89. In addition, for example, the power source 91 is connected to a home generator 95 located in the house 89 through a power hub 93, and, along with this, is capable of being connected to an outside centralized power system 97 through a smart meter 92 and the power hub 93.

Here, for example, the electrical apparatus 94 includes one or two or more home appliances such as a refrigerator, an air conditioner, a television or a water heater. For example, the home generator 95 is one type or two or more types of a solar generator, a wind turbine, or the like. For example, the electric vehicle 96 is one type or two or more types of an electric car, an electric bike, a hybrid car, or the like. For example, the centralized power system 97 is one type or two or more types a thermal power plant, a nuclear power plant, a hydroelectric power plants, a wind power plant or the like.

The control unit 90 controls the operation (including the use state of the power source 91) of the power storage system, for example, including a central processing unit (CPU) or the like. The power source 91 includes one or two or more rechargeable batteries (not shown). For example, the smart meter 92 is a network-enabled power meter located in the house 89 of the power demand side, and is capable of communicating with the power supply side. Along with this, for example, the smart meter 92 controls the balance of supply and demand in the house 89 while communicating with an external unit as necessary, and is capable of efficiently providing a stable power supply.

For example, in the power storage system, power is stored in the power source 91 through the smart meter 92 and the power hub 93 from the centralized power system 97 which is an external power source and, along with this, power is stored in the power source 91 through the power hub 93 from the solar generator 95 which is an independent power source. Since the power stored in the power source 91 is supplied to the electrical apparatus 94 or the electric vehicle 96 as necessary according to the instructions from the control unit 91, the electrical apparatus 94 becomes operable and the electric vehicle 96 is capable of being charged. That is, the power storage system uses the power source 91 and enables the storage and supply of power in the house 89.

It is possible to arbitrarily use the power stored in the power source 91. For this reason, for example, power may be stored in the power source 91 from the centralized power system 97 at night when the electricity consumption is low, and the power stored in the power source 91 may be used in the day which the electricity consumption is high.

Here, the above-described power storage system may be located in each house (one household), or may be located in a plurality of houses (a plurality of households).

3-4. Power Tool

Figure 18:
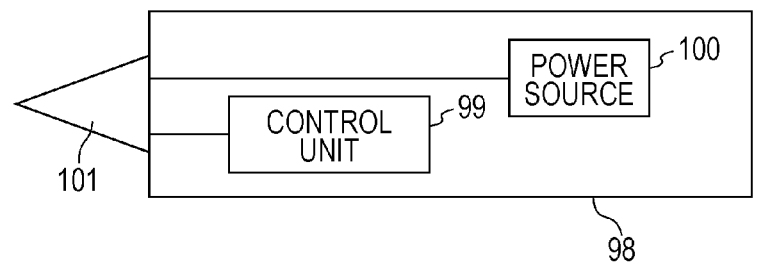
FIG. 18 is a block diagram representing a configuration of an application example (power tool) of the rechargeable battery.

FIG. 18 represents a block configuration of a power tool. For example, as shown in FIG. 18, the power tool is an electric drill and is provided with a control unit 99 and a power source 100 in an inner portion of a tool main body 98 formed of plastic material or the like. For example, a drill portion 101 which is a movable part is capable of being attached to the tool main body 98 so as to be operable (rotatable).

The control unit 99 controls the operation (including the use state of the power source 100) of the power tool, for example, including a central processing unit (CPU) or the like. The power source 100 includes one or two or more rechargeable batteries (not shown). This control unit 99 supplies power to the drill portion 101 from the power source 100 as necessary to enable the movement thereof according to the operation of an operation switch (not shown).

EXAMPLES

Detailed description will be given of Examples of the present application.

Examples 1-1 to 1-12

According to the following procedure, the laminate film type rechargeable battery shown in FIG. 13 and FIG. 14 was manufactured.

In a case of manufacturing the positive electrode 53, first, 91 parts by mass of positive electrode active material (LiCoO$_2$), 6 parts by mass of positive electrode conductive material (graphite), and 3 parts by mass of positive electrode binding agent (polyvinylidene fluoride: PVDF) were mixed to form a positive electrode mixture. Subsequently, the positive electrode mixture was dispersed in an organic solvent (N-methyl-2-pyrrolidone: NMP) mixture to form a paste-like positive electrode mixture slurry. Subsequently, the positive electrode active material layer 53B was formed by coating the positive electrode mixture slurry on both surfaces of the positive electrode current collector 53A (Al foil strip having a thickness of 12 μm) using a coating apparatus and then performing drying. Finally, the positive electrode active material layer 53B was compression-molded using a roll press machine. In this case, the thickness of the positive electrode active material layer 53B was adjusted so that Li metal was not deposited in the negative electrode 54 when fully charged.

In a case of manufacturing the negative electrode 54, first, a highly crystalline Si oxide (SiO$_x$ median diameter D50=4 μm) was obtained using a gas atomization method. In this case, the composition (atom ratio z) was controlled by adjusting the O$_2$ introduction amount during melting and solidification of the raw material (Si). Subsequently, the negative electrode active material was obtained by heating (1000° C. or less) the Si oxide while supplying H$_2$ gas, and reducing the surface of the Si oxide. The configuration of the negative electrode active material is as shown in Table 1. In the atomic ratios, the "surface" is the atomic ratio of the outermost surface, the "inner portion" is the atomic ratio of a position of 300 nm from the surface toward the center, "transition" is the transition (tendency of the atomic ratio to change in the direction toward the center) of the atomic ratio between the surface and the above-described inner portion position. Finally, as necessary, the conductive layer (C) was formed on the surface of the negative electrode active material using a vapor deposition method. Here, the average thickness of the conductive layer=100 nm, the average coating ratio=80%, and the ratio IG/ID=1.8.

Subsequently, after mixing the negative electrode active material and a precursor of the negative electrode binding agent at a drying weight ratio of 90:10, the result was diluted with NMP to form a paste-like negative electrode mixture slurry. The precursor of the negative electrode binding agent is a polyamic acid including NMP and N,N-dimethylacetamide (DMAC). Subsequently, the negative electrode mixture slurry was coated and dried on both surfaces of the negative electrode current collector 54A (rolled Cu foil having a thickness of 15 μm) using a coating apparatus. Finally, after hot pressing the coated film in order to increase the binding property, firing (400° C.×1 hour) was performed in a vacuum atmosphere. In this manner, since the negative electrode binding agent (polyimide) was formed, the negative electrode active material layer 54B including the negative electrode active material and the negative electrode binding agent was formed. Here, the thickness of the negative electrode active material layer 54B was adjusted such that the negative electrode use rate became 65%.

In a case of preparing the electrolytic solution, an electrolytic salt ($LiPF_6$) is dissolved in a solvent (ethylene carbonate (EC) and diethyl carbonate (DEC)). In such a case, the composition of the solvent is set to EC:DEC=50:50 by weight ratio, and the content of the electrolytic salt is set to 1 mol/kg with respect to the solvent.

In a case of assembling the rechargeable battery, first, the positive electrode lead 51 made of Al was welded to one end of the positive electrode current collector 53A and, along with this, the negative electrode lead 52 made of Ni was welded to one end of the negative electrode current collector 54A. Subsequently, after the positive electrode 53, the separator 55, the negative electrode 54 and the separator 55 were laminated in this order and wound in the longitudinal direction to form a wound body which is a precursor of the wound electrode body 50, the end portion of the winding is fixed with protective tape 57 (adhesive tape). The separator 55 is a laminate film (thickness 20 μm) in which a film in which porous polyethylene is the main component is interposed by films in which porous polypropylene is the main component. Subsequently, after interposing the wound body in the external member 60, the outermost peripheral edge portions other than one side of the outermost peripheral edge portion are thermally fused, and the wound body is accommodated in the inner portion of the bag-like external member 60. From the outside, the external member 60 is an aluminum laminated film in which a nylon film (thickness 30 μm), Al foil (thickness 40 μm), and unstretched polypropylene film (thickness 30 μm) are laminated. Subsequently, an electrolytic solution was injected from the opening portion of the external member 60 and impregnated in the separator 55 to form a wound electrode body 50. Finally, the opening portion of the external member 60 was thermally fused in a vacuum atmosphere.

When the initial charging and discharging characteristics and cycle characteristics of the rechargeable battery were investigated, the results shown in Table 1 were obtained.

In a case of investigating the initial charging and discharging characteristics, first, in order to stabilize the battery state, the rechargeable battery was charged and discharged for one cycle in the atmosphere at room temperature (23° C.). Subsequently, after measuring the charging capacity by recharging the rechargeable battery in the same atmosphere, the discharging capacity was measured by discharging. Finally, the initial efficiency (%)=(discharge capacity/charge capacity)×100 was computed. During charging, after charging until the voltage reached 4.2 V at a fixed current density of 3 $mA/cm^2$, charging was performed again until the current density reached 0.3 $mA/cm^2$ at a fixed voltage of 4.2 V. During discharging, discharging was performed until the voltage reached 2.5 V at a fixed current density of 3 $mA/cm^2$.

In a case of investigating the cycle characteristics, first, after charging and discharging the rechargeable battery for one cycle in order to stabilize the battery state, charging and discharging were performed again and the discharging capacity was measured. Subsequently, the discharging capacity was measured by charging and discharging the rechargeable battery until the total number of cycles reached 100. Finally, the capacity maintenance efficiency (%)=(discharge capacity of hundredth cycle/discharge capacity of second cycle)×100 was computed. The atmosphere temperature and the charging and discharging conditions were set to be the same as the case where the charging and discharging characteristics were investigated.

TABLE 1

| Example | Negative electrode active material Type | z | Atomic ratio (atomic %) Surface | Inner portion | Tendency | Conductive layer | Initial efficiency (%) | Capacity maintenance rate (%) |
|---|---|---|---|---|---|---|---|---|
| 1-1 | $SiO_z$ | 1.2 | 20 | 40 | Increase | — | 61 | 81 |
| 1-2 | | | 25 | 45 | | | 63 | 82 |
| 1-3 | | | 30 | 50 | | | 65 | 83 |
| 1-4 | | | 30 | 30 | Constant | | 68 | 84 |
| 1-5 | | | 50 | 35 | Decrease | | 68 | 85 |
| 1-6 | | | 50 | 50 | Constant | | 68 | 86 |
| 1-7 | | | 70 | 55 | Decrease | | 69 | 84 |
| 1-8 | | | 75 | 60 | | | 69 | 83 |
| 1-9 | | | 80 | 65 | | | 69 | 79 |
| 1-10 | | | 85 | 70 | | | 70 | 78 |
| 1-11 | $SiO_z$ | 1.2 | 50 | 50 | Constant | C | 69 | 88 |
| 1-12 | | | 75 | 60 | Decrease | | 70 | 84 |

The initial efficiency and the capacity maintenance rate changed according to the atomic ratio in the surface and the inner portion of the negative electrode active material ($SiO_z$). In this case, if the tendency of the atomic ratio was constant or decreasing, a trend in which the initial efficiency and the capacity maintenance rate increased was obtained. In particular, when the atomic ratio of the surface was 30 atomic % to 75 atomic %, a high initial efficiency and capacity maintenance rate were obtained, and when the atomic ratio was 30 atomic % to 70 atomic %, a higher capacity maintenance rate was obtained. In addition, when the atomic ratio of the inner portion was 35 atomic % to 60 atomic %, a higher initial efficiency and capacity maintenance rate were obtained. In addition, when a conductive layer is formed on the surface of the negative electrode active material, the initial efficiency and capacity maintenance rate were increased.

Examples 2-1 to 2-18

As shown in Table 2, except for the fact that a low crystallinity negative electrode active material was used, rechargeable batteries were manufactured according to the same procedures as Examples 1-6 and 1-8 and various characteristics were investigated. In this case, the physical properties (average area occupancy rate and average particle diameter) of the negative electrode active material were controlled by adjusting the melting temperature and the like of the raw material.

Even when the crystallinity of the negative electrode active material ($SiO_z$) was changed, the same results as Table 1 were obtained. That is, when the atomic ratio of the surface was 30 atomic % to 75 atomic %, a high initial efficiency and capacity maintenance rate were obtained and, along with this, when a conductive layer was formed on the surface of the negative electrode active material, the initial efficiency and capacity maintenance rate were further increased.

Examples 3-1 to 3-19

Except for the fact that the configuration of the negative electrode active material was changed, rechargeable batteries were manufactured according to the same procedures as Examples 1-1 to 1-12 and various characteristics were investigated.

In a case of manufacturing the negative electrode 54, first, a highly crystalline core portion ($SiO_x$ median diameter D50=4 μm) was obtained using a gas atomization method. In this case, the composition (atom ratio x) was controlled by adjusting the $O_2$ introduction amount during melting and solidification of the raw material (Si). The physical properties of the core portion are half-value width=0.6°, and crystallite size=90 nm. Subsequently, a non-crystalline single layer coating portion ($SiO_y$) was formed on the surface of the core portion using a powder deposition method. In this case, the composition (atom ratio y) was controlled by adjusting the $O_2$ or $H_2$ introduction amount during the deposition of the raw material (Si). In the powder deposition method, a vacuum state (pressure=$1\times10^{-3}$ Pa) was set using resistive heating and an induction heating vapor deposition source and using a turbo-molecular pump with a deposition rate of 2 nm/second. The configurations of the core portion and the coating portion are as shown in Table 3. Here, the "inner portion" relating to the atomic ratio signifies the atomic ratio in the interface of the core portion and the coating portion.

TABLE 2

| | Negative electrode active material | | | | | | | | |
|---|---|---|---|---|---|---|---|---|---|
| | | | Average area occupancy | Average particle diameter | Atomic ratio (atomic %) | | | Conductive | Initial efficiency | Capacity maintenance |
| Example | Type | z | rate (%) | (nm) | Surface | Inner portion | Tendency | layer | (%) | rate (%) |
| 2-1 | $SiO_z$ | 1.2 | 1 | 3 | 50 | 50 | Constant | — | 68 | 85 |
| 2-2 | | | 10 | 17.5 | | | | | 68 | 84 |
| 2-3 | | | 20 | 22 | | | | | 68 | 83.5 |
| 2-4 | | | 25 | 25 | | | | | 68 | 82.1 |
| 2-5 | | | 30 | 27.5 | | | | | 69 | 81 |
| 2-6 | | | 35 | 30 | | | | | 69 | 80.5 |
| 2-7 | | | 35 | 35 | | | | | 69 | 79 |
| 2-8 | | | 35 | 41.5 | | | | | 69 | 78.8 |
| 2-9 | | | 35 | 50 | | | | | 70 | 78 |
| 2-10 | | | 35 | 55 | | | | | 70 | 74 |
| 2-11 | | | 40 | 60 | | | | | 70 | 73.4 |
| 2-12 | | | 40 | 70 | | | | | 70 | 72.1 |
| 2-13 | $SiO_z$ | 1.2 | 10 | 17.5 | 75 | 60 | Decrease | — | 68.5 | 83.1 |
| 2-14 | | | 35 | 30 | | | | | 68.5 | 80 |
| 2-15 | | | 35 | 50 | | | | | 70.5 | 77 |
| 2-16 | | | 35 | 55 | | | | | 70.5 | 73 |
| 2-17 | $SiO_z$ | 1.2 | 10 | 17.5 | 50 | 50 | Constant | C | 69 | 85 |
| 2-18 | $SiO_x$ | 1.2 | 10 | 17.5 | 75 | 60 | Decrease | C | 69 | 83.5 |

TABLE 3

| Example | Core portion (High crystallinity) Type | x | Coating portion (Non-crystallinity) Type | y | Atomic ratio Surface | Inner portion | Tendency | Conductive layer | Initial efficiency (%) | Capacity maintenance rate (%) |
|---|---|---|---|---|---|---|---|---|---|---|
| 3-1 | $SiO_x$ | 0.1 | $SiO_y$ | 0.4 | 80 | 65 | Decrease | — | 87 | 80 |
| 3-2 | | | | 0.5 | 75 | 60 | | | 86 | 82 |
| 3-3 | | | | 0.6 | 70 | 55 | | | 85 | 83 |
| 3-4 | | | | 0.8 | 60 | 50 | | | 84 | 85 |
| 3-5 | | | | 1 | 50 | 50 | Constant | | 83.5 | 84 |
| 3-6 | | | | 1.2 | 50 | 50 | | | 82.5 | 84 |
| 3-7 | | | | 1.4 | 30 | 45 | Increase | | 82 | 81 |
| 3-8 | | | | 1.8 | 27.5 | 45 | | | 80 | 80.3 |
| 3-9 | | | | 1.9 | 25 | 45 | | | 77 | 80.5 |
| 3-10 | | | | 2 | 33 | 33 | Constant | | 75 | 80 |
| 3-11 | $SiO_x$ | 0 | $SiO_y$ | 0.8 | 60 | 50 | Decrease | — | 85 | 83 |
| 3-12 | | 0.05 | | | | | | | 84.5 | 84 |
| 3-13 | | 0.2 | | | | | | | 83 | 85.5 |
| 3-14 | | 0.3 | | | | | | | 82 | 86 |
| 3-15 | | 0.4 | | | | | | | 81 | 86.5 |
| 3-16 | | 0.45 | | | | | | | 80.5 | 87 |
| 3-17 | | 0.5 | | | | | | | 80 | 87 |
| 3-18 | | 0.6 | | | | | | | 78 | 85.5 |
| 3-19 | $SiO_x$ | 0.1 | $SiO_y$ | 0.8 | 60 | 50 | Decrease | C | 86 | 88 |

Even when the single layer coating portion was formed on the surface of the core portion, the same results as Table 1 were obtained. That is, when the atomic ratio of the surface was 30 atomic % to 75 atomic %, a high initial efficiency and capacity maintenance rate were obtained and, along with this, when a conductive layer was formed on the surface of the negative electrode active material, the initial efficiency and capacity maintenance rate were further increased. In particular, when the atom ratio x satisfied $0 \leq x \leq 0.5$ and, along with this, the atom ratio y of the coating portion satisfied $0.5 \leq y \leq 1.8$, a higher initial efficiency and capacity maintenance rate were obtained.

Examples 4-1 and 4-2

As shown in Table 4, except for the fact that a multi-layer coating portion was formed and a conductive layer was filled in the spaces of the coating portion as necessary, a rechargeable battery was manufactured according to the same procedure as Example 3-4 and various characteristics were investigated.

In a case of forming the coating portion, by intermittently repeating deposition processes from multiple directions while rotating the core portion using a shutter mechanism, the coating portion was made to have multiple layers and spaces were formed in between the layers. In addition, in a case of forming a conductive layer, by using a thermal decomposition CVD method (with methane gas as the carbon source gas), a part of the conductive layer was embedded (sealed) in the spaces of the coating portion.

TABLE 4

| Example | Core portion (High crystallinity) Type | x | Coating portion (Non-crystallinity) Type | y | Atomic ratio (atomic %) Surface | Inner portion | Tendency | Conductive layer Type | Seal | Initial efficiency (%) | Capacity maintenance rate (%) |
|---|---|---|---|---|---|---|---|---|---|---|---|
| 4-1 | $SiO_x$ | 0.1 | $SiO_y$ | 0.8 | 60 | 50 | Decrease | C | No | 84 | 86.5 |
| 4-2 | | | (Multilayer) | | | | | | Yes | 85 | 87 |

When the coating portion is set to be multilayer and spaces are formed, a higher capacity maintenance rate is obtained and, along with this, when the spaces are sealed with the conductive layer, a higher initial efficiency and capacity maintenance rate were obtained.

Examples 5-1 to 5-11

As shown in Table 5, except for the fact that the median diameter (D50) of the core portion was changed, a rechargeable battery was manufactured according to the same procedure as Example 3-4 and various characteristics were investigated. In this case, in the process of forming the core portion, raw material (Si) having a different median diameter was used.

TABLE 5

| Example | Core portion (High crystallinity) Type | x | D50 (μm) | Coating portion (Non-crystallinity) Type | y | Atomic ratio (atomic %) Surface | Inner portion | Tendency | Initial efficiency (%) | Capacity maintenance rate (%) |
|---|---|---|---|---|---|---|---|---|---|---|
| 5-1 | SiO$_x$ | 0.1 | 0.08 | SiO$_y$ | 0.8 | 60 | 50 | Decrease | 79 | 84 |
| 5-2 | | | 0.1 | | | | | | 80 | 85 |
| 5-3 | | | 0.2 | | | | | | 81 | 85 |
| 5-4 | | | 0.5 | | | | | | 82 | 85 |
| 5-5 | | | 1 | | | | | | 83 | 85 |
| 5-6 | | | 7 | | | | | | 84 | 84 |
| 5-7 | | | 10 | | | | | | 84 | 83 |
| 5-8 | | | 15 | | | | | | 83 | 82 |
| 5-9 | | | 20 | | | | | | 81 | 80.5 |
| 5-10 | | | 25 | | | | | | 79 | 78 |
| 5-11 | | | 30 | | | | | | 78 | 77 |

When the median diameter (D50) was 0.1 μm to 20 μm, a higher initial efficiency and capacity maintenance rate were obtained.

Examples 6-1 to 6-12

As shown in Table 6, except for the fact that the average thickness and average coating rate of the coating portion were changed, a rechargeable battery was manufactured according to the same procedure as Example 3-4 and various characteristics were investigated. In such a case, in the process of forming the coating portion, the average thickness was adjusted by changing the deposition rate and the deposition time, and, along with this, the average coating rate was adjusted by changing the input power and deposition time.

TABLE 6

| Example | Core portion (High crystallinity) Type | x | Coating portion (Non-crystallinity) Type | y | Average thickness (nm) | Average coating rate (%) | Atomic ratio (atomic %) Surface | Inner portion | Tendency | Initial efficiency (%) | Capacity maintenance rate (%) |
|---|---|---|---|---|---|---|---|---|---|---|---|
| 6-1 | SiO$_x$ | 0.1 | SiO$_y$ | 0.8 | 1 | 80 | 60 | 50 | Decrease | 87 | 80 |
| 6-2 | | | | | 10 | | | | | 86 | 80.5 |
| 6-3 | | | | | 100 | | | | | 85 | 83 |
| 6-4 | | | | | 500 | | | | | 83 | 86 |
| 6-5 | | | | | 1000 | | | | | 82 | 87 |
| 6-6 | | | | | 2000 | | | | | 80.5 | 87 |
| 6-7 | | | | | 3000 | | | | | 80 | 87 |
| 6-8 | | | | | 5000 | | | | | 78 | 87 |
| 6-9 | SiO$_x$ | 0.1 | SiO$_y$ | 0.8 | 200 | 20 | 60 | 50 | Decrease | 86 | 79 |
| 6-10 | | | | | | 30 | | | | 85.5 | 81 |
| 6-11 | | | | | | 50 | | | | 85 | 83 |
| 6-12 | | | | | | 100 | | | | 84 | 87 |

When the average thickness was 1 nm to 3000 nm, a higher initial efficiency was obtained and, along with this, when the average coating rate was 30% to 100%, a higher capacity maintenance rate was obtained.

Examples 7-1 to 7-23

As shown in Table 7, except for the fact that the crystallinity of the coating portion was changed, a rechargeable battery was manufactured according to the same procedure as Example 3-4 and various characteristics were investigated. In such a case, SiO$_y$ was deposited while heating in an atmosphere of Ar gas to form a coating portion having low crystallinity and, along with this, the temperature and time during the heating were adjusted to adjust the physical properties (average area occupancy rate, average particle diameter, and magnitude correlation) of the coating portion. The "magnitude correlation" is the correlation of the average area occupancy rate and the average particle diameter in the inside portion and the outside portion when the coating portion is bisected in the thickness direction.

TABLE 7

| Example | Core portion (High crystallinity) Type | x | Coating portion (Low-crystallinity) Type | y | Average area occupancy rate (%) | Average particle diameter (nm) | Magnitude correlation | Atomic ratio (atomic %) Surface | Inner portion | Tendency | Initial efficiency (%) | Capacity maintenance rate (%) |
|---|---|---|---|---|---|---|---|---|---|---|---|---|
| 7-1 | $SiO_x$ | 0.1 | $SiO_y$ | 0.8 | 0.5 | 1.5 | Inner side ≥ Outer side | 60 | 50 | Decrease | 84.1 | 84.9 |
| 7-2 | | | | | 1 | 3 | | | | | 84.5 | 84.7 |
| 7-3 | | | | | 2 | 10 | | | | | 84.9 | 84.6 |
| 7-4 | | | | | 3.5 | 12.5 | | | | | 85 | 84.4 |
| 7-5 | | | | | 5 | 14 | | | | | 85.2 | 84.3 |
| 7-6 | | | | | 7.5 | 15.5 | | | | | 85.6 | 84.1 |
| 7-7 | | | | | 10 | 17.5 | | | | | 85.7 | 84 |
| 7-8 | | | | | 15 | 20 | | | | | 85.9 | 83.5 |
| 7-9 | | | | | 20 | 22 | | | | | 86 | 83.4 |
| 7-10 | | | | | 25 | 25 | | | | | 86.2 | 83.2 |
| 7-11 | | | | | 30 | 27.5 | | | | | 86.4 | 83.1 |
| 7-12 | | | | | 35 | 30 | | | | | 86.7 | 83 |
| 7-13 | | | | | 35 | 35 | | | | | 86.8 | 81.4 |
| 7-14 | | | | | 35 | 41.5 | | | | | 86.9 | 81.2 |
| 7-15 | | | | | 35 | 50 | | | | | 87 | 81 |
| 7-16 | | | | | 35 | 55 | | | | | 87.3 | 79.8 |
| 7-17 | | | | | 40 | 60 | | | | | 87 | 75.1 |
| 7-18 | | | | | 40 | 70 | | | | | 87.1 | 73.2 |
| 7-19 | | | | | 40 | 33 | | | | | 86.5 | 78.5 |
| 7-20 | | | | | 45 | 36 | | | | | 86.7 | 79.6 |
| 7-21 | | | | | 50 | 38.5 | | | | | 86.9 | 79.5 |
| 7-22 | $SiO_x$ | 0.1 | $SiO_y$ | 0.8 | 2 | 10 | Inner side < Outer side | 60 | 50 | Decrease | 84.8 | 81.5 |
| 7-23 | | | | | 15 | 20 | | | | | 85.8 | 81 |

When the average area occupancy rate was 35% or less and the average particle diameter was 50 nm or less, and the average area occupancy rate and the average particle diameter were inside≥outside, a higher capacity maintenance rate was obtained.

Examples 8, 9-1 to 9-17, 10-1 to 10-5

As shown in Tables 8 to 10, except for the fact that metal elements were included in the negative electrode active material, rechargeable batteries were manufactured according to the same procedures as Examples 1-6 and 3-4 and various characteristics were investigated. In such a case, co-deposition was performed using $SiO_x$ powder and metal powder as the raw materials.

TABLE 8

| Example | Negative electrode active material Type | x | Metal element Type | Content (wt %) | Atomic ratio (atomic %) Surface | Inner portion | Tendency | Initial efficiency (%) | Capacity maintenance rate (%) |
|---|---|---|---|---|---|---|---|---|---|
| 8 | $SiO_x$ | 1.2 | Fe | 0.5 | 50 | 50 | Constant | 71 | 85 |

TABLE 9

| Example | Core portion (High crystallinity) Type | x | Metal element Type | Content (wt %) | Coating portion (Non-crystallinity) Type | y | Atomic ratio (atomic %) Surface | Inner portion | Tendency | Initial efficiency (%) | Capacity maintenance rate (%) |
|---|---|---|---|---|---|---|---|---|---|---|---|
| 9-1 | $SiO_x$ | 0.1 | Fe | 0.01 | $SiO_y$ | 0.8 | 60 | 50 | Decrease | 84.2 | 85 |
| 9-2 | | | | 0.1 | | | | | | 84.4 | 85.2 |
| 9-3 | | | | 0.2 | | | | | | 84.6 | 85.4 |
| 9-4 | | | | 0.5 | | | | | | 84.8 | 85.5 |
| 9-5 | | | | 1 | | | | | | 85 | 85.6 |
| 9-6 | | | | 2 | | | | | | 85.3 | 85.7 |
| 9-7 | | | | 5 | | | | | | 85.4 | 85.8 |
| 9-8 | | | | 7.5 | | | | | | 85.6 | 85.9 |
| 9-9 | $SiO_x$ | 0.1 | Fe + Al | 0.4 + 0.3 | $SiO_y$ | 0.8 | 60 | 50 | Decrease | 85 | 86 |
| 9-10 | | | Fe + Al + Ca | 0.4 + 0.2 + 0.1 | | | | | | 85.2 | 86.5 |
| 9-11 | | | Fe + Al + Mn | 0.4 + 0.2 + 0.1 | | | | | | 85.4 | 86.4 |
| 9-12 | | | Fe + Al + Ca | 0.2 + 0.07 + 0.02 | | | | | | 85.5 | 86.3 |
| 9-13 | | | Fe + Al + Ca | 0.23 + 0.08 + 0.02 | | | | | | 85.5 | 86.5 |
| 9-14 | | | Fe + Mn | 0.4 + 0.3 | | | | | | 85.6 | 86.4 |
| 9-15 | | | Fe + Cr | 0.4 + 0.3 | | | | | | 85.4 | 86.2 |
| 9-16 | | | Fe + Mg | 0.4 + 0.3 | | | | | | 85.3 | 86.5 |
| 9-17 | | | Fe + Ni | 0.4 + 0.3 | | | | | | 85.5 | 86.3 |

TABLE 10

| Example | Core portion (High crystallinity) Type | x | Coating portion (Non-crystallinity) Type | y | Metal element Type | Content (wt %) | Atomic ratio (atomic %) Surface | Inner portion | Tendency | Initial efficiency (%) | Capacity maintenance rate (%) |
|---|---|---|---|---|---|---|---|---|---|---|---|
| 10-1 | $SiO_x$ | 0.1 | $SiO_y$ | 0.8 | Fe | 0.01 | 60 | 50 | Decrease | 84.5 | 85.1 |
| 10-2 | | | | | Al | 0.01 | | | | 84.3 | 85.2 |
| 10-3 | | | | | Ca | 0.01 | | | | 84.2 | 85.1 |
| 10-4 | | | | | Fe + Al | 0.05 + 0.01 | | | | 84.6 | 85.6 |
| 10-5 | | | | | Fe + Al + Ca | 0.05 + 0.01 + 0.01 | | | | 84.8 | 85.8 |

When metal elements were included in the negative electrode active material, one or both of the initial efficiency and the capacity maintenance rate were increased. In particular, in a case where Fe was included in the core portion, when the content of the Fe was 0.01 wt % to 7.5 wt %, a high initial efficiency and capacity maintenance rate were obtained.

Examples 11-1 to 11-18

As shown in Table 11, except for the fact that a conductive layer configuration was formed, a rechargeable battery was manufactured according to the same procedure as Example 3-4 and various characteristics were investigated. In such a case, in the process of forming the conductive layer, respective adjustments were performed on the average thickness by changing the deposition rate and the deposition time, on the average coating rate by changing the input power and deposition time, and on the ratios IG/ID by varying the pressure, decomposition temperature and gas type.

TABLE 11

| Example | Core portion (High crystallinity) Type | x | Coating portion (Non-crystallinity) Type | y | Atomic ratio (atomic %) Surface | Inner portion | Tendency | Conductive layer Type | Average thickness (nm) | Average coating rate (%) | Ratio IG/ID | Initial efficiency (%) | Capacity maintenance rate (%) |
|---|---|---|---|---|---|---|---|---|---|---|---|---|---|
| 11-1 | $SiO_x$ | 0.1 | $SiO_y$ | 0.8 | 60 | 50 | Decrease | C | 60 | 50 | 0.2 | 85 | 79 |
| 11-2 | | | | | | | | | | | 0.3 | 85 | 83 |
| 11-3 | | | | | | | | | | | 0.5 | 85 | 83.5 |
| 11-4 | | | | | | | | | | | 1 | 84 | 84 |
| 11-5 | | | | | | | | | | | 1.5 | 84 | 84.5 |
| 11-6 | | | | | | | | | | | 2 | 84 | 85 |
| 11-7 | | | | | | | | | | | 2.5 | 83 | 84 |
| 11-8 | | | | | | | | | | | 3 | 83 | 83 |
| 11-9 | | | | | | | | | | | 3.2 | 82 | 81 |
| 11-10 | | | | | | | | | | | 3.5 | 81 | 79 |

TABLE 11-continued

| | Core portion (High crystallinity) | | Coating portion (Non-crystallinity) | | Atomic ratio (atomic %) | | | Conductive layer | | | Initial efficiency (%) | Capacity maintenance rate (%) |
|---|---|---|---|---|---|---|---|---|---|---|---|---|
| | | | | | | Inner | | | Average coating rate (%) | Ratio IG/ID | | |
| Example | Type | x | Type | y | Surface | portion | Tendency | Type | Average thickness (nm) | | | |
| 11-11 | SiO$_x$ | 0.1 | SiO$_y$ | 0.8 | 60 | 50 | Decrease | C | 20 | 50 | 1.8 | 84 | 83 |
| 11-12 | | | | | | | | | 50 | | | 84 | 84 |
| 11-13 | | | | | | | | | 200 | | | 83 | 85 |
| 11-14 | | | | | | | | | 300 | | | 82 | 86 |
| 11-15 | SiO$_x$ | 0.1 | SiO$_y$ | 0.8 | 60 | 50 | Decrease | C | 100 | 20 | 1.8 | 81 | 84 |
| 11-16 | | | | | | | | | | 30 | | 82 | 85 |
| 11-17 | | | | | | | | | | 50 | | 83 | 85 |
| 11-18 | | | | | | | | | | 100 | | 84 | 86 |

When the conductive layer was formed, the initial efficiency and capacity maintenance rate were further increased. In such a case, when the average thickness was 200 nm or less, the average coating rate was 30% to 100%, and the ratio IG/ID was 0.3 to 3.2, a higher initial efficiency and capacity maintenance rate were obtained.

Examples 12-1 to 12-3

As shown in Table 12, except for the fact that C and S were included in the negative electrode current collector 54A, rechargeable batteries were manufactured according to the same procedures as Example 3-4 and various characteristics were investigated. In such a case, rolled Cu foil containing C and S was used as the negative electrode current collector 54A.

TABLE 12

| | Negative electrode current collector C, S content included (ppm) | Core portion (High crystallinity) | | Coating portion (Non-crystallinity) | | Atomic ratio (atomic %) | | | Initial efficiency (%) | Capacity maintenance rate (%) |
|---|---|---|---|---|---|---|---|---|---|---|
| | | | | | | | Inner | | | |
| Example | | Type | x | Type | y | Surface | portion | Tendency | | |
| 12-1 | 50 | SiO$_x$ | 0.1 | SiO$_y$ | 0.8 | 60 | 50 | Decrease | 84 | 85.7 |
| 12-2 | 100 | | | | | | | | 84 | 85.6 |
| 12-3 | 200 | | | | | | | | 84 | 85.5 |

When the negative electrode current collector 54A contained C and S, the initial efficiency and capacity maintenance rate were further increased. In such a case, when the content of C and S was 100 ppm or less, a higher capacity maintenance rate was obtained.

Examples 13-1 to 13-9

As shown in Table 13, except for the fact that the type of the negative electrode binding agent was changed, a rechargeable battery was manufactured according to the same procedure as Example 3-4 and various characteristics were investigated. In such a case, as the negative electrode binding agent, polyamide-imide (PAI), polyvinylidene fluoride (PVDF), polyamide (PA), polyacrylic acid (PAA), lithium polyacrylate (PAAL), polyimide carbide (PI carbide), polyethylene (PE), polymaleic acid (PMA), or aramid (AR) was used. In addition, in a case where PAA, PAAL, and the like are used, a negative electrode mixture slurry was prepared using an aqueous solution in which these are dissolved at 17% volume, and, along with this, a negative electrode active material layer 54B was formed without firing after hot pressing.

TABLE 13

| | Negative electrode binding agent | Core portion (High crystallinity) | | Coating portion (Non-crystallinity) | | Atomic ratio (atomic %) | | | Initial efficiency (%) | Capacity maintenance rate (%) |
|---|---|---|---|---|---|---|---|---|---|---|
| | | | | | | | Inner | | | |
| Example | | Type | x | Type | y | Surface | portion | Tendency | | |
| 13-1 | PAI | SiO$_x$ | 0.1 | SiO$_y$ | 0.8 | 60 | 50 | Decrease | 83.8 | 84.8 |
| 13-2 | PVDF | | | | | | | | 83.6 | 85 |
| 13-3 | PA | | | | | | | | 83.7 | 84.9 |
| 13-4 | PAA | | | | | | | | 84 | 85.2 |
| 13-5 | PAAL | | | | | | | | 84.1 | 85.1 |
| 13-6 | PI carbide | | | | | | | | 84.3 | 85 |
| 13-7 | PE | | | | | | | | 84.1 | 84.9 |
| 13-8 | PMA | | | | | | | | 83.9 | 85.1 |
| 13-9 | AR | | | | | | | | 83.8 | 84.9 |

Even when the type of the negative electrode binding agent was changed, a higher initial efficiency and capacity maintenance rate were obtained.

Examples 14-1 to 14-12

As shown in Table 14, except for the fact that the type of the positive electrode active material was changed, a rechargeable battery was manufactured according to the same procedure as Example 3-4 and various characteristics were investigated.

TABLE 14

| Example | Positive electrode active material | Core portion (High crystallinity) Type | x | Coating portion (Non-crystallinity) Type | y | Atomic ratio (atomic %) Surface | Inner portion | Tendency | Initial efficiency (%) | Capacity maintenance rate (%) |
|---|---|---|---|---|---|---|---|---|---|---|
| 14-1 | $LiNi_{0.7}Co_{0.25}Al_{0.05}O_2$ | $SiO_x$ | 0.1 | $SiO_y$ | 0.8 | 60 | 50 | Decrease | 84 | 84.8 |
| 14-2 | $LiNi_{0.79}Co_{0.14}Al_{0.07}O_2$ | | | | | | | | 84.2 | 85 |
| 14-3 | $LiNi_{0.7}Co_{0.25}Mg_{0.05}O_2$ | | | | | | | | 84.1 | 85.6 |
| 14-4 | $LiNi_{0.7}Co_{0.25}Fe_{0.05}O_2$ | | | | | | | | 83.9 | 84.9 |
| 14-5 | $LiNiO_2$ | | | | | | | | 84 | 85 |
| 14-6 | $LiNi_{0.33}Co_{0.33}Mn_{0.33}O_2$ | | | | | | | | 84.2 | 85.2 |
| 14-7 | $LiNi_{0.13}Co_{0.6}Mn_{0.27}O_2$ | | | | | | | | 84.3 | 85.1 |
| 14-8 | $Li_{1.13}[Ni_{0.22}Co_{0.18}Mn_{0.6}]_{0.87}O_2$ | | | | | | | | 84.1 | 84.9 |
| 14-9 | $Li_{1.13}[Ni_{0.2}Co_{0.2}Mn_{0.6}]_{0.87}O_2$ | | | | | | | | 84 | 85 |
| 14-10 | $Li_{1.13}[Ni_{0.18}Co_{0.22}Mn_{0.6}]_{0.87}O_2$ | | | | | | | | 84.2 | 85.3 |
| 14-11 | $Li_{1.13}[Ni_{0.25}Co_{0.25}Mn_{0.5}]_{0.87}O_2$ | | | | | | | | 84.1 | 85.1 |
| 14-12 | $Li_2Ni_{0.4}Cu_{0.6}O_2$ | | | | | | | | 84 | 85 |

Even when the type of the positive electrode active material was changed, a higher initial efficiency and capacity maintenance rate were obtained.

Examples 15-1, 15-2, 16-1, 16-2

As shown in Tables 15 and 16, except for the fact that lithium ions were pre-doped into the negative electrode active material, rechargeable batteries were manufactured according to the same procedures as Examples 1-6 and 3-4 and various characteristics were investigated. As a pre-doping method, in a "powder mixture", the positive electrode active material or the like and Li metal powder were mixed to prepare the negative electrode mixture and, along with this, in the "deposition", Li metal was deposited using a deposition method after the creation of the negative electrode 54.

TABLE 15

| Example | Pre-doping method | Negative electrode active material Type | x | Atomic ratio (atomic %) Surface | Inner portion | Tendency | Initial efficiency (%) | Capacity maintenance rate (%) |
|---|---|---|---|---|---|---|---|---|
| 15-1 | Powder mixture | $SiO_x$ | 1.2 | 50 | 50 | Constant | 85 | 88 |
| 15-2 | Deposition | | | | | | 85 | 88.5 |

TABLE 16

| Example | Pre-doping method | Core portion (High crystallinity) Type | x | Coating portion (Non-crystallinity) Type | y | Atomic ratio (atomic %) Surface | Inner portion | Tendency | Initial efficiency (%) | Capacity maintenance rate (%) |
|---|---|---|---|---|---|---|---|---|---|---|
| 16-1 | Powder mixture | $SiO_x$ | 0.1 | $SiO_y$ | 0.8 | 60 | 50 | Decrease | 90 | 86.5 |
| 16-2 | Deposition | | | | | | | | 90 | 87 |

When the pre-doping was performed, a higher initial efficiency and capacity maintenance rate were obtained.

From the results of Tables 1 to 16, in the negative electrode active material including Si and O as constituent elements, when the atomic ratio (Si/(Si+O)) in the surface of the negative electrode active material was 30 atomic % to 75 atomic %, excellent initial charging and discharging characteristics and cycle characteristics were obtained.

Above, the present application has been described with reference to embodiments and examples; however, the present application is not limited to the forms described in these embodiments and examples, and various modifications are possible. For example, in the rechargeable battery according to an embodiment of the present application, the capacity of the negative electrode includes a capacity due to the occlusion and release of the lithium ions and a capacity according to dispersion and dissolution of the lithium ions, and the same is applicable for a rechargeable battery in which the battery capacity is represented by the sum of these capacities. In such a case, the negative electrode material capable of occluding and releasing lithium ions is used and, along with this, the chargeable capacity of the negative electrode material is set so as to be smaller than the discharging capacity of the positive electrode.

In addition, for example, the rechargeable battery according to an embodiment of the present application is similarly applicable to a case of having another battery structure such as a coin type or a button type, and to a case in which the battery element has another structure such as a laminated structure.

In addition, for example, the electrode reactant may be another group 1 element such as Na or K, a group 2 element such as Mg or Ca, or another light metal such as Al. Since the effect according to an embodiment of the present application should be obtainable regardless of the type of the electrode reactant, it is possible to obtain the same effect even when the type of the electrode reactant is changed.

In addition, in the embodiments and Examples, with respect to the atomic ratio, description is given of the appropriate ranges derived from the results of the Examples. However, the description thereof does not completely deny the possibility that the atomic ratio may be outside the ranges described above. That is, since the appropriate ranges described above are simply particularly preferable ranges in terms of obtaining the effect according to an embodiment of the present application, as long as the effect according to an embodiment of the present application is obtained, the atomic ratio may deviate somewhat from the ranges described above. The above also applies with respect to the other numerical ranges, such as the average area occupancy rate and the average particle diameter defined by the claims.

Here, the present application may also adopt the following configuration.

(1) A rechargeable battery including: a positive electrode; a negative electrode including active material; and an electrolytic solution, in which the active material is capable of occluding and releasing lithium ions and includes Si and O as constituent elements, and in which an atomic ratio (Si/(Si+O)) of Si with respect to Si and O is 30 atomic % to 75 atomic % in a surface of the active material.

(2) The rechargeable battery according to the above-described (1), in which, at least in a surface vicinity portion in the active material, the atomic ratio is decreased, or constant, toward the center from the surface of the active material.

(3) The rechargeable battery according to the above-described (1) or (2), in which at least the surface vicinity portion in the active material is non-crystalline, or low crystalline with crystal regions (crystal grains) scattered in non-crystalline regions.

(4) The rechargeable battery according to the above-described (3), in which, in the low crystalline portion of the active material, an average area occupancy rate of crystal grains due to a (111) surface and a (220) surface of Si is 35% or less and an average particle diameter of the crystal grains is 50 nm or less.

(5) The rechargeable battery according to any one of the above-described (1) to (4),
in which an atom ratio z (O/Si) of O with respect to Si of the active material satisfies $0.5 \leq z \leq 1.8$,
in which the atomic ratio gradually decreases toward a center between a surface of the active material and a position at 300 nm toward the center from the surface, and
in which the atomic ratio at the position at 300 nm toward the center from the surface of the active material is 35 atomic % to 60 atomic %.

(6) The rechargeable battery according to any one of the above-described (1) to (4),
in which the active material includes a core portion and a coating portion provided at least at a part of a surface of the core portion,
in which an atom ratio x (O/Si) of O with respect to Si of the core portion satisfies $0 \leq x < 0.5$,
in which an atom ratio y (O/Si) of O with respect to Si of the coating portion satisfies $0.5 \leq y \leq 1.8$,
in which the atomic ratio gradually decreases toward an interface of the core portion and the coating portion from a surface of the active material, and
in which the atomic ratio at the interface is 35 atomic % to 60 atomic %.

(7) The rechargeable battery according to the above-described (6),
in which a median diameter (D50) of the core portion is 0.1 μm to 20 μm,
in which an average thickness of the coating portion is 1 nm to 3000 nm, and
in which an average coating rate of the coating portion with respect to the core portion is 30% or more.

(8) The rechargeable battery according to the above-described (6) or (7),
in which a crystallinity of the coating portion is lower than a crystallinity of the core portion, and the coating portion has low crystallinity,
in which, when the coating portion is bisected in the thickness direction, an average area occupancy rate and an average particle diameter in an inner portion of the crystal grains derived from a (111) surface and a (220) surface of Si are the same or greater than an average area occupancy rate and an average particle diameter in an outer portion, and
in which, in the coating portion, the average area occupancy rate of the crystal grains derived from the (111) surface and the (220) surface of Si is 35% or less, and the average particle diameter of the crystal grains is 50 nm or less.

(9) The rechargeable battery according to any one of the above-described (6) to (8),
in which the coating portion has multiple layers with spaces between the layers, and
in which a conductive material including C as a constituent element is provided at least a part in the spaces.

(10) The rechargeable battery according to any one of the above-described (1) to (9),
in which a conductive layer is provided on at least a part of the surface of the active material, in which the conductive layer includes C as a constituent element, in which a ratio IG/ID of a G band peak intensity IG and a D band peak intensity ID of the conductive layer measured by a Raman spectrum method is 0.3 to 3.2.

(11) The rechargeable battery according to the above-described (10), in which the average thickness of the conductive layer is 200 nm, or less, and in which an average coating rate of the conductive layer with respect to the active material is 30% or more.

(12) The rechargeable battery according to any one of the above-described (1) to (11), in which the negative electrode has an active material layer on a current collector and the active material layer includes the active material, and in which the current collector includes C and S as constituent elements and the content thereof is 100 ppm or less.

(13) The rechargeable battery according to any one of the above-described (1) to (12), in which at least a part of Si in the active material in the uncharged state is alloyed with Li.

(14) An active material for a rechargeable battery, which is capable of occluding and releasing lithium ions and includes Si and O as constituent elements, and of which an atomic ratio (Si/(Si+O)) of Si with respect to Si and O is 30 atomic % to 75 atomic % in a surface.

(15) An electronic apparatus including:
a rechargeable battery as a power supply source,
in which the rechargeable battery includes a positive electrode, a negative electrode including an active material, and an electrolytic solution,
in which the active material is capable of occluding and releasing lithium ions and includes Si and O as constituent elements,
in which the atomic ratio (Si/(Si+O)) of Si with respect to Si and O is 30 atomic % to 75 atomic % in a surface.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A rechargeable battery comprising:
a positive electrode;
a negative electrode including active material; and
an electrolytic solution,
wherein the active material is capable of occluding and releasing lithium ions and includes Si and O as constituent elements,
wherein an atomic ratio (Si/(Si+O)) of Si with respect to Si and O is 30 atomic % to 75 atomic % in a surface of the active material,
wherein the active material includes a core portion and a coating portion provided at least at a part of a surface of the core portion,
wherein the coating portion includes one or more spaces in an inner portion of the coating portion, and
wherein a conductive material is provided in at least a part of the one or more spaces of the coating portion.

2. The rechargeable battery according to claim 1, wherein, at least in a surface vicinity portion in the active material, the atomic ratio is decreased, or constant, toward the center from the surface of the active material.

3. The rechargeable battery according to claim 1, wherein at least a surface vicinity portion in the active material is non-crystalline, or low crystalline with crystal regions (crystal grains) scattered in non-crystalline regions.

4. The rechargeable battery according to claim 3, wherein, in a low crystalline portion of the active material, an average area occupancy rate of crystal grains due to a (111) surface and a (220) surface of Si is 35% or less and an average particle diameter of the crystal grains is 50 nm or less.

5. The rechargeable battery according to claim 1,
wherein an atom ratio z (O/Si) of O with respect to Si of the active material satisfies $0.5 \leq z \leq 1.8$,
wherein the atomic ratio gradually decreases toward a center between a surface of the active material and a position at 300 nm toward the center from the surface, and
wherein the atomic ratio at the position at 300 nm toward the center from the surface of the active material is 35 atomic % to 60 atomic %.

6. The rechargeable battery according to claim 1,
wherein an atom ratio x (O/Si) of O with respect to Si of the core portion satisfies $0 \leq x < 0.5$,
wherein an atom ratio y (O/Si) of O with respect to Si of the coating portion satisfies $0.5 \leq y \leq 1.8$,
wherein the atomic ratio gradually decreases toward an interface of the core portion and the coating portion from a surface of the active material, and
wherein the atomic ratio at the interface is 35 atomic % to 60 atomic %.

7. The rechargeable battery according to claim 6,
wherein a median diameter (D50) of the core portion is 0.1 μm to 20 μm,
wherein an average thickness of the coating portion is 1 nm to 3000 nm, and
wherein an average coating rate of the coating portion with respect to the core portion is 30% or more.

8. The rechargeable battery according to claim 6,
wherein a crystallinity of the coating portion is lower than a crystallinity of the core portion, and the coating portion has low crystallinity,
wherein, in an event the coating portion is bisected in the thickness direction, an average area occupancy rate and an average particle diameter in an inner portion of the crystal grains derived from a (111) surface and a (220) surface of Si are equal to or greater than an average area occupancy rate and an average particle diameter in an outer portion, and
wherein, in the coating portion, the average area occupancy rate of the crystal grains due to the (111) surface and the (220) surface of Si is 35% or less, and the average particle diameter of the crystal grains is 50 nm or less.

9. The rechargeable battery according to claim 6,
wherein the coating portion has multiple layers with spaces between the layers, and
wherein a conductive material including C as a constituent element is provided at at least a part in the spaces.

10. The rechargeable battery according to claim 1,
wherein a conductive layer is provided on at least a part of the surface of the active material,
wherein the conductive layer includes C as a constituent element,
wherein a ratio IG/ID of a G band peak intensity IG and a D band peak intensity ID of the conductive layer measured by a Raman spectrum method is 0.3 to 3.2.

11. The rechargeable battery according to claim 10,
wherein an average thickness of the conductive layer is 200 nm, or less, and
wherein an average coating rate of the conductive layer with respect to the active material is 30% or more.

12. The rechargeable battery according to claim 1,
wherein the negative electrode has an active material layer on a current collector and the active material layer includes the active material, and
wherein the current collector includes C and S as constituent elements and the content thereof is 100 ppm or less.

13. The rechargeable battery according to claim 1, wherein at least a part of Si in the active material in an uncharged state is alloyed with Li.

14. An active material for a rechargeable battery, which is capable of occluding and releasing lithium ions and includes Si and O as constituent elements, and of which an atomic ratio (Si/(Si+O)) of Si with respect to Si and O is 30 atomic % to 75 atomic % in a surface, comprising:
 a core portion; and
 a coating portion provided at least at a part of a surface of the core portion,
 wherein the coating portion includes one or more spaces in an inner portion of the coating portion, and
 wherein a conductive material is provided in at least a part of the one or more spaces of the coating portion.

15. An electronic apparatus comprising:
a rechargeable battery as a power supply source,
wherein the rechargeable battery includes
 a positive electrode,
 a negative electrode including an active material, and
 an electrolytic solution,
 wherein the active material is capable of occluding and releasing lithium ions and includes Si and O as constituent elements,
 wherein the atomic ratio (Si/(Si+O)) of Si with respect to Si and O is 30 atomic % to 75 atomic % in a surface,
 wherein the active material includes a core portion and a coating portion provided at least at a part of a surface of the core portion,
 wherein the coating portion includes one or more spaces in an inner portion of the coating portion, and
 wherein a conductive material is provided in at least a part of the one or more spaces of the coating portion.

* * * * *